United States Patent
Madanapalli et al.

(10) Patent No.: US 12,166,654 B2
(45) Date of Patent: Dec. 10, 2024

(54) APPARATUS AND PROCESS FOR DETECTING, IDENTIFYING, AND ESTIMATING USER EXPERIENCE OF ONLINE GAMES

(71) Applicant: Canopus Networks Pty Ltd, Eveleigh (AU)

(72) Inventors: Sharat Chandra Madanapalli, Eveleigh (AU); Hassan Habibi Gharakheili, Eveleigh (AU); Vijay Sivaraman, Eveleigh (AU)

(73) Assignee: CANOPUS NETWORKS ASSETS PTY LTD, Eveleigh (AU)

( * ) Notice: Subject to any disclaimer, the term of this patent is extended or adjusted under 35 U.S.C. 154(b) by 278 days.

(21) Appl. No.: 17/640,604

(22) PCT Filed: Sep. 4, 2020

(86) PCT No.: PCT/AU2020/050935
§ 371 (c)(1),
(2) Date: Mar. 4, 2022

(87) PCT Pub. No.: WO2021/042173
PCT Pub. Date: Mar. 11, 2021

(65) Prior Publication Data
US 2022/0345386 A1    Oct. 27, 2022

(30) Foreign Application Priority Data
Sep. 5, 2019   (AU) ................................ 2019903276

(51) Int. Cl.
*H04L 43/087*   (2022.01)
*A63F 13/335*   (2014.01)
(Continued)

(52) U.S. Cl.
CPC .......... *H04L 43/087* (2013.01); *A63F 13/335* (2014.09); *A63F 13/358* (2014.09);
(Continued)

(58) Field of Classification Search
CPC ... H04L 43/087; H04L 43/026; H04L 43/106; H04L 47/2441; H04L 47/2475
See application file for complete search history.

(56) References Cited

U.S. PATENT DOCUMENTS

| | | |
|---|---|---|
| 10,091,281 B1 | 10/2018 | Lockhart |
| 2007/0070914 A1 | 3/2007 | Abigail |

(Continued)

FOREIGN PATENT DOCUMENTS

| | | | | |
|---|---|---|---|---|
| WO | WO 2009/045150 A1 | 4/2009 | | |
| WO | WO-2016119822 A1 * | 8/2016 | ............. | H04L 41/00 |

OTHER PUBLICATIONS

Madanapalli, sharat Chandra et al, "Assisting Delay and Bandwidth Sensitive Applications in a self-Driving Network"), Association for Computing MachineryNew YorkNYUnited States; SIGCOMM '19: ACM SIGCOMM 2019 Conference Beijing China Aug. 23, 2019 (Year: 2019).*

(Continued)

*Primary Examiner* — Siming Liu
(74) *Attorney, Agent, or Firm* — Fenwick & West LLP; Daniel R. Brownstone

(57) ABSTRACT

A computer-implemented process for estimating user experience of online gaining, including the step of monitoring the flow of network packets of an online game at a monitoring location between a client gaining device and a game server to generate estimates of at least one of latency and jitter in the flow of network packets of the online game as a measure of user experience of the online game.

26 Claims, 17 Drawing Sheets

(51) Int. Cl.
*A63F 13/358* (2014.01)
*H04L 43/026* (2022.01)
*H04L 43/106* (2022.01)
*H04L 47/2441* (2022.01)
*H04L 47/2475* (2022.01)

(52) U.S. Cl.
CPC .......... *H04L 43/026* (2013.01); *H04L 43/106* (2013.01); *H04L 47/2441* (2013.01); *H04L 47/2475* (2013.01)

(56) References Cited

U.S. PATENT DOCUMENTS

| | | | |
|---|---|---|---|
| 2010/0205369 A1* | 8/2010 | Chang | G06F 12/0866 711/E12.019 |
| 2010/0268834 A1* | 10/2010 | Eidelman | H04L 41/5096 709/230 |
| 2010/0273558 A1 | 10/2010 | Gustafsson et al. | |
| 2012/0311126 A1* | 12/2012 | Jadallah | H04L 65/80 709/224 |
| 2015/0381506 A1 | 12/2015 | Evans et al. | |
| 2017/0006497 A1* | 1/2017 | Thubert | H04L 47/11 |
| 2019/0164518 A1 | 5/2019 | Dimitrov | |
| 2021/0006482 A1* | 1/2021 | Hwang | H04L 43/103 |
| 2021/0044572 A1* | 2/2021 | Liu | G06N 3/08 |

OTHER PUBLICATIONS

PCT International Search Report and Written Opinion, PCT Application No. PCT/AU2020/050935, Sep. 28, 2020, 10 pages.

European Patent Office, Extended European Search Report and Opinion, EP Patent Application No. EP 20860438, Aug. 24, 2023, 10 pages.

Hubballi, N., et al. "BitCoding: Network Traffic Classification through encoded Bit Level Signatures," IEEE/ACM Transactions On Networking, vol. 26, No. 5, Oct. 2018, pp. 2334-2346.

Hynek, K., et al. "Ultra High Resolution Jitter Measurement Method for Ethernet Based Networks," IEEE 9th Annual Computing and Communication Workshop and Conference (CCWC), Jan. 7, 2019, pp. 0847-0851.

Madanapalli, S., et al. "Assisting Delay and Bandwidth Sensitive Applications in a Self-Driving Network," NetAI '19: ACM SIGCOMM 2019 Workshop on Network Meets AI & ML, Aug. 14, 2019, pp. 64-69.

* cited by examiner

APPARATUS AND PROCESS FOR DETECTING, IDENTIFYING, AND ESTIMATING USER EXPERIENCE OF ONLINE GAMES

TECHNICAL FIELD

The present invention relates to online gaming, and in particular to an apparatus and process for detecting online gaming sessions, detecting sessions of specific known online games, and estimating in real-time the user experience of online gaming.

BACKGROUND

The market for online gaming is large and growing rapidly—in 2018, 1.1 billion gamers globally spent $137.9 billion USD on gaming. The online gaming industry's compound annual growth rate of 11% since 2012 is expected to rise even further in coming years, as traditional PC-based and console-based platforms are joined by cloud-based streaming platforms such as Google Stadia and Microsoft xCloud. Revenue models have also been changing, with many games being free to play, and monetised by enticing players to make in-game purchases—indeed, a recent study has shown that 69% of Fortnite players spend money inside the free game, averaging $85 each, making it the game that has made the most annual revenue in history, a whopping $2.4 billion USD in 2018.

With users being spoilt for choice of free games, game providers have strong incentives to give users a superlative gaming experience each time to ensure 'stickiness' leading to more in-game purchases. User experience in turn depends heavily on network conditions, because interactive multi-player shooting, strategy, and sporting games are extremely sensitive to latency. However, unlike one-way streaming video services like Netflix and Youtube that use client-side buffering to smooth out network variations over timescales of seconds and minutes to give users a glitch-free viewing experience, gaming relies on real-time interaction, and network glitches of even a hundred milliseconds can impact gameplay. Indeed, games like Fortnite and CS:GO continuously monitor and report network ping, and even temporary spikes in ping (referred to as "lag") often result in undesirable game outcomes and extreme frustration for users.

Realizing the opportunity, several companies such as Haste, Wtfast, and Outfox have built dedicated global networks that only carry gaming traffic. These are offered to consumers as gaming acceleration platforms in the form of VPN software that users install on their clients so that gaming packets are tunneled to their dedicated networks before being handed over to the gaming servers, thereby bypassing the Internet "middle-mile". Internet Service Providers (ISPs) are also showing appetite to cash in on the gaming boom (having learnt from their inability to monetize streaming video over the past decade). For example, MyRepublic offers packages for gamers in the Asia-Pacific region, while in the US Cox Cable has recently announced the "Cox Elite Gamer" package that costs $15 extra per-month (which is incidentally more expensive than Netflix!). Though ISPs are starting to dip their toes into the gaming market, their understanding of gaming patterns and gaming experience is still rudimentary at best.

It is desired to overcome or alleviate one or more difficulties of the prior art, or to at least provide a useful alternative.

SUMMARY

In accordance with some embodiments of the present invention, there is provided a computer-implemented process for estimating user experience of online gaming, including the step of monitoring the flow of network packets of an online game at a monitoring location between a client gaming device and a game server to generate estimates of at least one of latency and jitter in the flow of network packets of the online game as a measure of user experience of the online game.

In some embodiments, the step of monitoring includes repeatedly generating the estimates of at least one of latency and jitter in the flow of network packets to determine the estimates as a continuous measure of user experience of the online game.

In some embodiments, the estimates include estimates of jitter. In some embodiments, the estimates include estimates of latency. In some embodiments, estimates include estimates of latency and estimates of jitter.

In some embodiments, the computer-implemented process includes displaying the determined estimates in real-time. The monitoring location may be within an Internet Service Provider (ISP) or other access network.

In some embodiments, the step of monitoring includes the steps of:
(i) counting network packets of an online game over a first time period of a first length to determine a network packet count;
(ii) for each network packet of a subset of the counted network packets over a second time period within the first time period, measuring a corresponding arrival time for the network packet at the monitoring location;
(iii) determining an average time between the counted network packets by dividing the first length of the first time period by the network packet count;
(iv) for each of the network packets of the subset of the counted network packets, determining a corresponding ideal arrival time for the network packet from the average time between the counted network packets and the start or finish of the first time period;
(v) for each network packet of the subset of the counted packets, determining a corresponding deviation of the measured arrival time of the network packet from the ideal arrival time of the network packet;
(vi) averaging the deviations for the subset of the counted packets to determine a corresponding jitter value for the second time period; and
(vii) sliding the first time period forward by a predetermined amount; and
(viii) repeating steps (i) to (vii) to determine successive jitter values for respective times.

In some embodiments, steps (i) to (vii) are repeated in real-time so that the jitter values are representative of real-time user experience of the online game.

In some embodiments, the step (vii) includes sliding the first time period forward by a length of the second time period.

In some embodiments, the length of the second time period is of the order of 1 second, and is preferably approximately 1 second, and the first length of the first time period is approximately several seconds.

In some embodiments, the step of monitoring includes determining a standard deviation of inter-packet arrival times of a tick-based UDP game as the measure of jitter.

In some embodiments, the step of monitoring includes monitoring timestamps and flow directions of UDP packets of a request-response based game to determine network latencies of the UDP packets.

In some embodiments, the step of monitoring includes monitoring download queuing periods of game packets to estimate corresponding queuing delays of the game packets due to limited download bandwidth of a gaming user, and determining a standard deviation of the queuing delays to provide the measurement of jitter.

In some embodiments, the step of monitoring includes measuring a latency of each of a plurality of TCP packets of an online game by using sequence and acknowledgement numbers to measure a corresponding downstream round-trip time between the monitoring location and the client gaming device and a corresponding upstream round-trip time between the monitoring location and the game server, and summing each upstream round-trip time for a TCP packet and the corresponding downstream round-trip time for the TCP packet to provide a corresponding round-trip time for the TCP packet between the client gaming device and the game server as an estimate of latency of the TCP packet.

In some embodiments, the computer-implemented process includes detecting online gaming sessions by matching attributes of network flows to predetermined attributes of network flows of known games so that said step of monitoring only monitors network packets of online games.

In some embodiments, the predetermined attributes of each known game network flow includes:
  (i) a Server Name Indication (SNI) of a corresponding TLS connection; and
  (ii) a corresponding pre-determined byte pattern of the known game network flow.

In some embodiments, the predetermined attributes of each known game network flow further include at least one of:
  (iii) a duration of a corresponding network flow;
  (iv) an upstream packet rate of the corresponding network flow; and
  (v) a downstream packet rate of the corresponding network flow.

In some embodiments, the computer-implemented process includes updating a forwarding table of a network switch to cause the network switch to selectively forward packets of a corresponding online game session for said monitoring.

In accordance with some embodiments of the present invention, there is provided a computer-implemented process for detecting online gaming sessions, including the steps of:
  (i) monitoring network packet flows at a monitoring location between one or more client gaming devices and one or more game servers;
  (ii) determining attributes of the monitored network packet flows; and
  (iii) detecting online gaming sessions by comparing the determined attributes of the monitored network packet flows with corresponding predetermined network packet flow attributes.

In some embodiments, the predetermined network packet flow attributes include:
  (i) at least one Server Name Indication (SNI) of a TLS connection of a corresponding TCP flow; and
  (ii) a corresponding pre-determined byte pattern of the known game network flow.

In some embodiments, the predetermined attributes of each known game network flow further include at least one of:
  (i) a duration of a corresponding network flow;
  (ii) an upstream packet rate of the corresponding network flow; and
  (iii) a downstream packet rate of the corresponding network flow.

In some embodiments, the predetermined attributes further include a server-side port number.

In some embodiments, the computer-implemented process includes updating a forwarding table of a network switch to cause the network switch to selectively forward packets of a corresponding online game session for said monitoring.

In some embodiments, the determined attributes of the monitored network packet flows are compared with corresponding predetermined network packet flow attributes using lookups of a two-level hash table for composite keys, wherein each composite key includes an identifier of a corresponding attribute and a corresponding value of the attribute, the identifier of the attribute providing a key for a first level of the two-level hash table, the value of the attribute providing a key for a second level of the two-level hash table, wherein a lookup of the two-level hash table for a composite key provides a list of one or more games matching the composite key.

In accordance with some embodiments of the present invention, there is provided an apparatus for estimating user experience of online gaming, including at least one processor configured to execute any one of the above processes.

In accordance with some embodiments of the present invention, there is provided a computer-readable storage medium having stored thereon processor-executable instructions that, when executed by at least one processor, cause the at least one processor to execute any one of the above processes.

In accordance with some embodiments of the present invention, there is provided an apparatus for estimating user experience of online gaming, including:
a memory;
at least one processor; and
  an experience estimation component configured to monitor the flow of network packets of an online game at a monitoring location between a client gaming device and a game server to generate estimates of at least one of latency and jitter in the flow of network packets of the online game as a measure of user experience of the online game.

In accordance with some embodiments of the present invention, there is provided an apparatus for detecting online gaming sessions, including:
a memory;
at least one processor;
an online gaming detection component configured to:
  (i) monitor network packet flows at a monitoring location between one or more client gaming devices and one or more game servers;
  (ii) determine attributes of the monitored network packet flows; and
  (iii) detect online gaming sessions by comparing the determined attributes of the monitored network packet flows with corresponding predetermined network packet flow attributes.

Also described herein is a computer-implemented process for estimating user experience of online gaming, including the step of monitoring the flow of network packets of an online game at a monitoring location between a client gaming device and a game server to measure jitter in the flow of network packets of the online game as a measure of user experience of the online game.

The step of monitoring may include repeatedly measuring jitter in the flow of network packets to determine jitter values as a continuous measure of user experience of the online game.

The computer-implemented process may include displaying the determined jitter values in real-time. The monitoring location may be an Internet Service Provider (ISP) or other network provider location.

The computer-implemented process may include detecting online gaming sessions by matching attributes of network flows to predetermined attributes of network flows of known games so that said step of monitoring only monitors network packets of online games.

The predetermined attributes of each known game network flow may include:
(i) a Server Name Indication (SNI) of a corresponding TLS connection;
(ii) a duration of a corresponding UDP flow;
(iii) an upstream packet rate of the corresponding UDP flow; and
(iv) a downstream packet rate of the corresponding UDP flow.

The computer-implemented process may include updating a forwarding table of a network switch to cause the network switch to selectively forward packets of a corresponding online game session for said monitoring.

Also described herein is a computer-implemented process for detecting online gaming sessions, including the steps of:
(i) monitoring network packet flows at a monitoring location between one or more client gaming devices and one or more game servers;
(ii) determining attributes of the monitored network packet flows; and
(iii) detecting online gaming sessions by comparing the determined attributes of the monitored network packet flows with corresponding predetermined network packet flow attributes.

Said comparing may include, for each UDP flow of the monitored network packet flows:
(i) determining a corresponding duration of the UDP flow;
(ii) comparing the duration of the UDP flow with a threshold value;
(iii) if the duration of the UDP flow exceeds the threshold value, then:
 (a) determining packet rates of the UDP flow;
 (b) after the UDP flow expires, determining whether the UDP flow was a UDP flow of an online gaming session by determining statistical measures of the determined packet rates, and comparing the determined statistical measures with respective threshold values of the statistical measures.

The threshold value for the duration of the UDP flow may be about 60 seconds.

The statistical measures may include a mean and standard deviation of the determined packet rates.

The determining step (b) may include determining whether the mean of the determined packet rates is between about 20 and 70 packets per second, and the standard deviation of the determined packet rates is less than about 10 packets per second.

The predetermined network packet flow attributes may include:
(i) at least one Server Name Indication (SNI) of a TLS connection of a corresponding TCP flow;
(ii) a duration of a corresponding UDP flow;
(iii) an upstream packet rate of the corresponding UDP flow; and
(iv) a downstream packet rate of the corresponding UDP flow.

The predetermined attributes further may include a server-side UDP port number.

The computer-implemented process may include updating a forwarding table of a network switch to cause the network switch to selectively forward packets of a corresponding online game session for said monitoring.

In accordance with some embodiments of the present invention, there is provided an apparatus including at least one processor configured to execute the processes above.

In accordance with some embodiments of the present invention, there is provided a computer-readable storage medium having stored thereon processor-executable instructions that, when executed by at least one processor, cause the at least one processor to execute the above processes.

BRIEF DESCRIPTION OF THE DRAWINGS

Some embodiments of the present invention are hereinafter described, by way of example only, with reference to the accompanying drawings, wherein.

DETAILED DESCRIPTION

Embodiments of the present invention include an apparatus and process that are able to detect individual online gaming sessions by monitoring attributes of network flows at the ISP level (i.e., the monitoring location is within an Internet Service Provider (ISP) or other access network). Additionally, the described apparatus and process are able to identify network flows of specific known online games from their unique combinations of network flow attributes. Finally, the apparatus and process are able to generate quantitative estimates of user experience of online gaming in real-time. These abilities, individually and in combination, provide network operators with quantitative insights into the volume of gaming traffic in their networks, the individual games being played by their customers, and the quality of their gaming experiences.

The inventors have identified that, in addition to network latency, a key factor affecting user experience of online gaming is the variation in network latency over time (referred to herein as 'jitter'), and consequently that measures of network latency variations over time are representative of user experience of online gaming over time.

Figure 2:
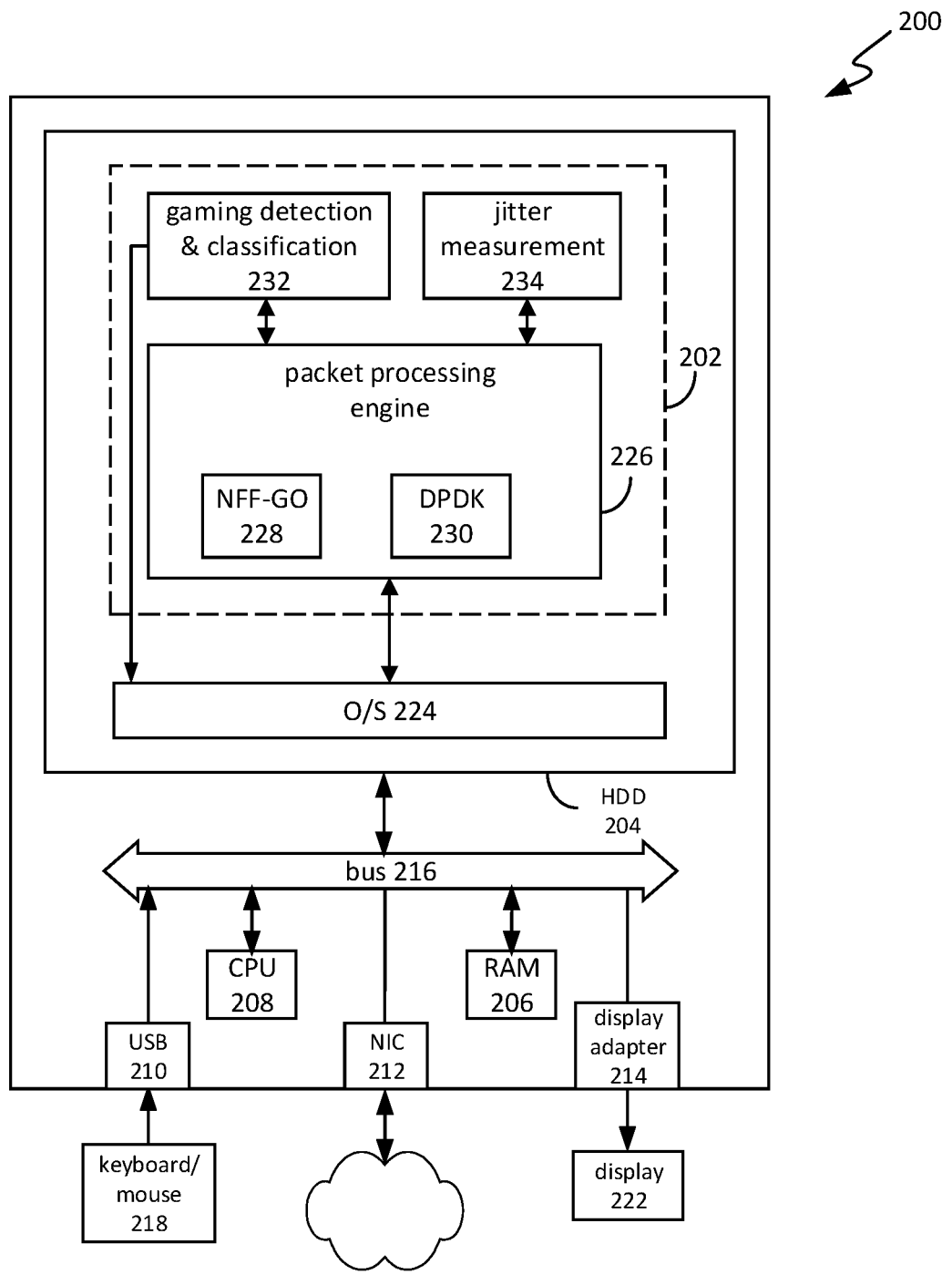
FIG. 2 is a block diagram of an apparatus for estimating user experience of online gaming, in accordance with an embodiment of the present invention.
Figure 3:
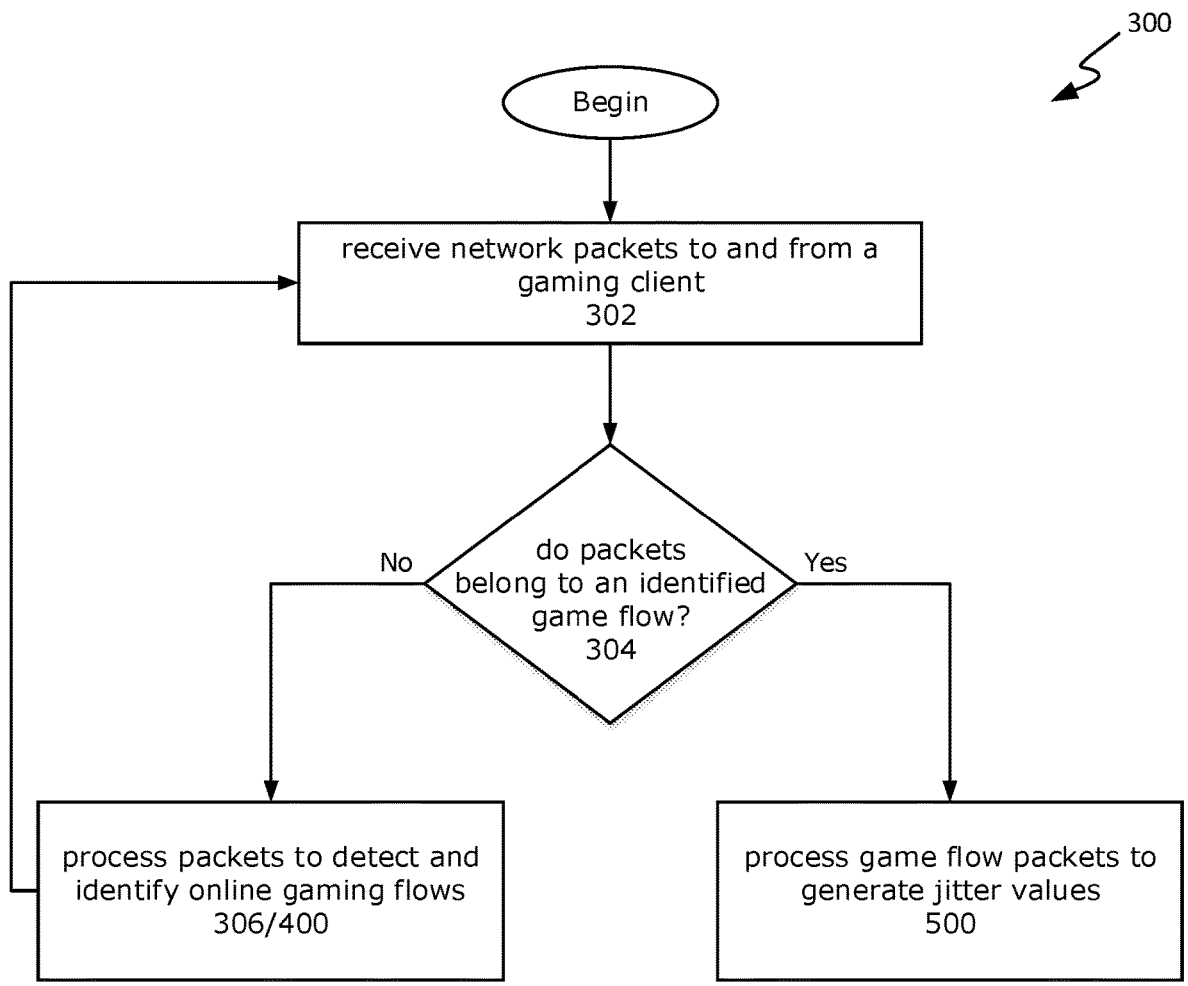
FIG. 3 is a flow diagram of a process for estimating user experience of online gaming, in accordance with an embodiment of the present invention.
Figure 4:
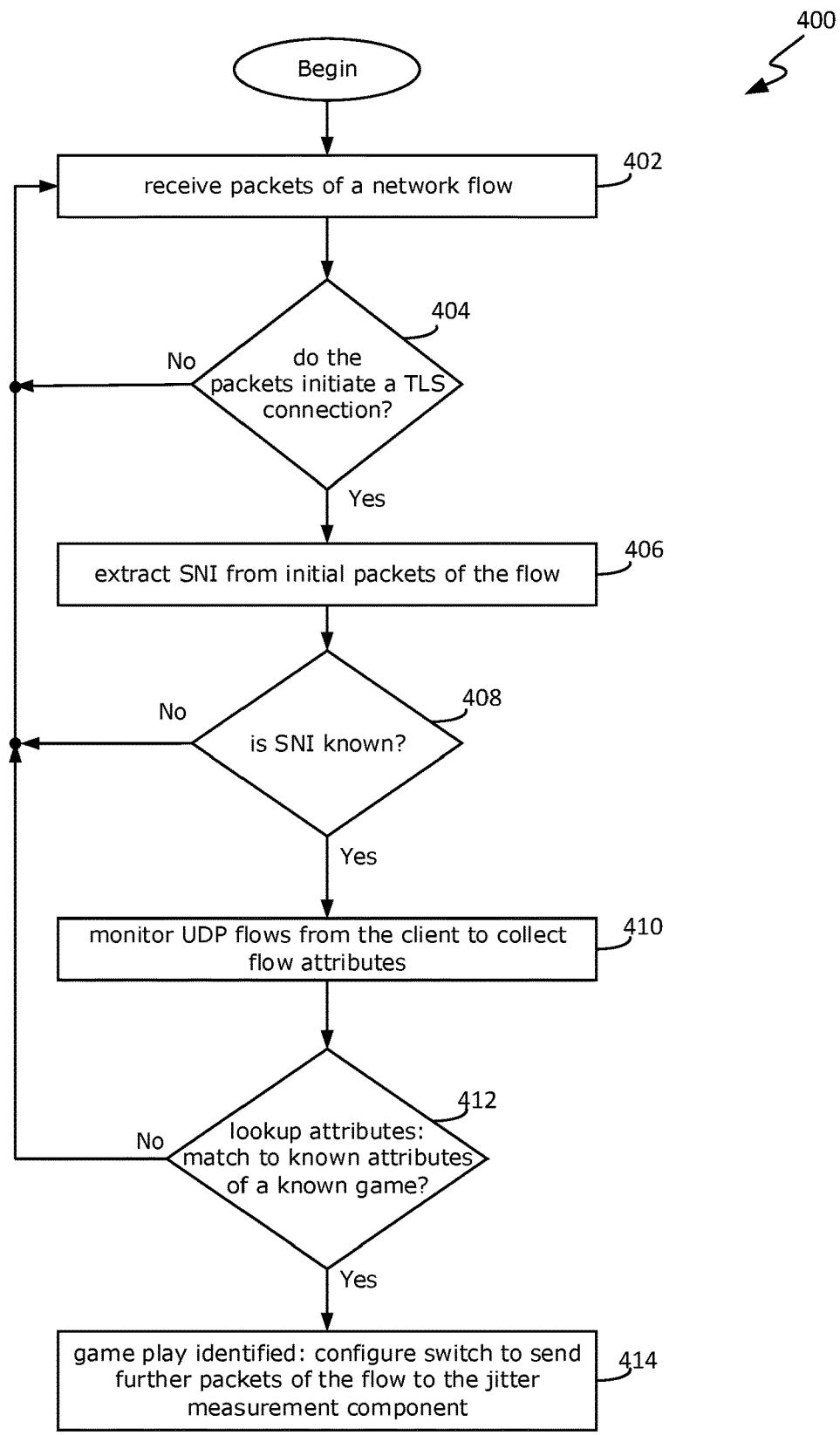
FIG. 4 is a flow diagram of a game detection and identification process of the process of FIG. 3.
Figure 5:
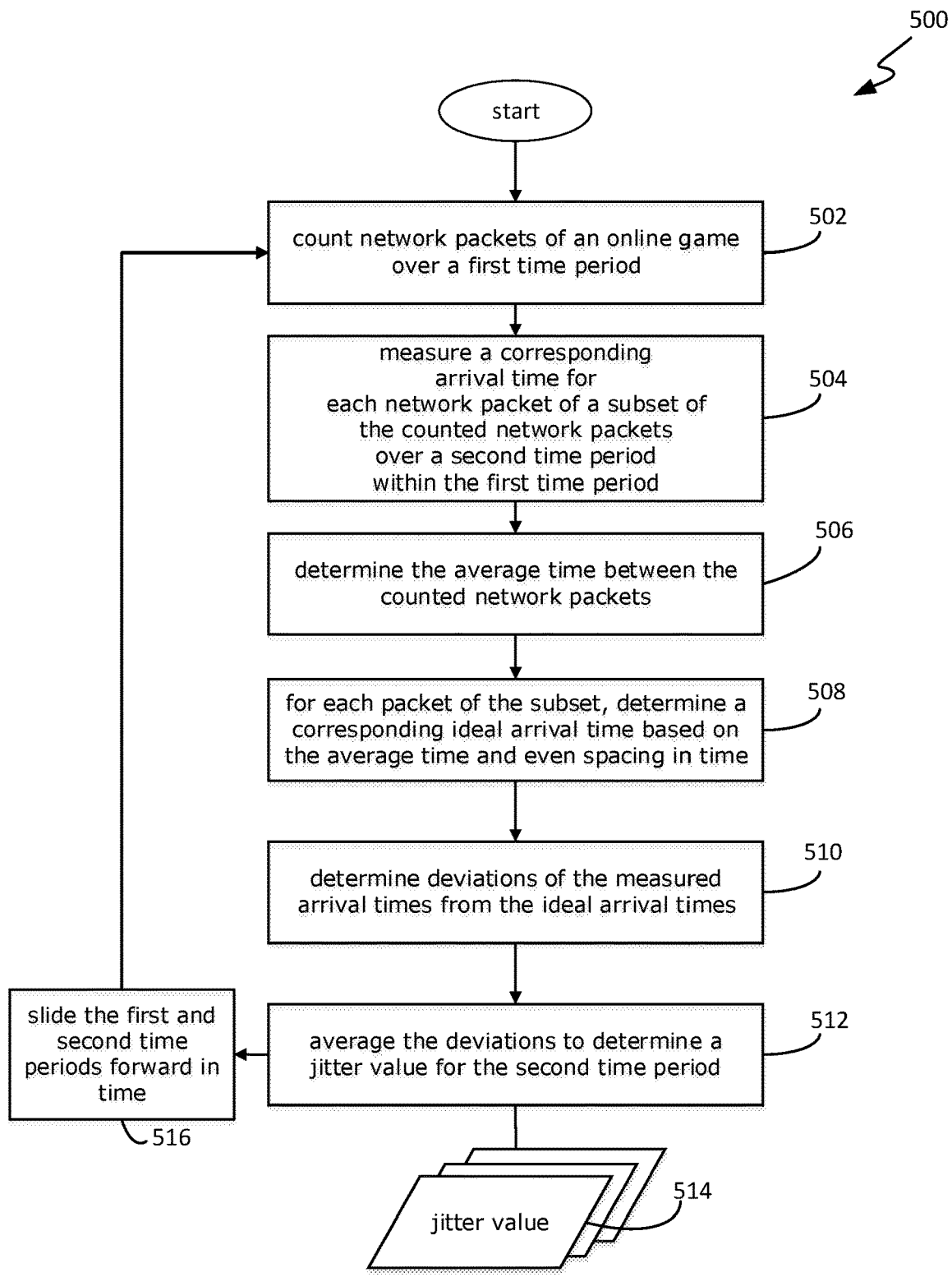
FIG. 5 is a flow diagram of a jitter measurement process of the process of FIG. 3.

With this in mind, embodiments of the present invention include an apparatus 200, as shown in FIG. 2, and process 300, as shown in FIGS. 3 to 5, that are able to generate real-time quantitative estimates of network packet latency and jitter of an online game from measurements of network flows at a monitoring location between a client gaming device 102 and one or more game servers 104. These quantitative estimates have been determined to be a good proxy for the gamer's experience of the online game.

Figure 1:
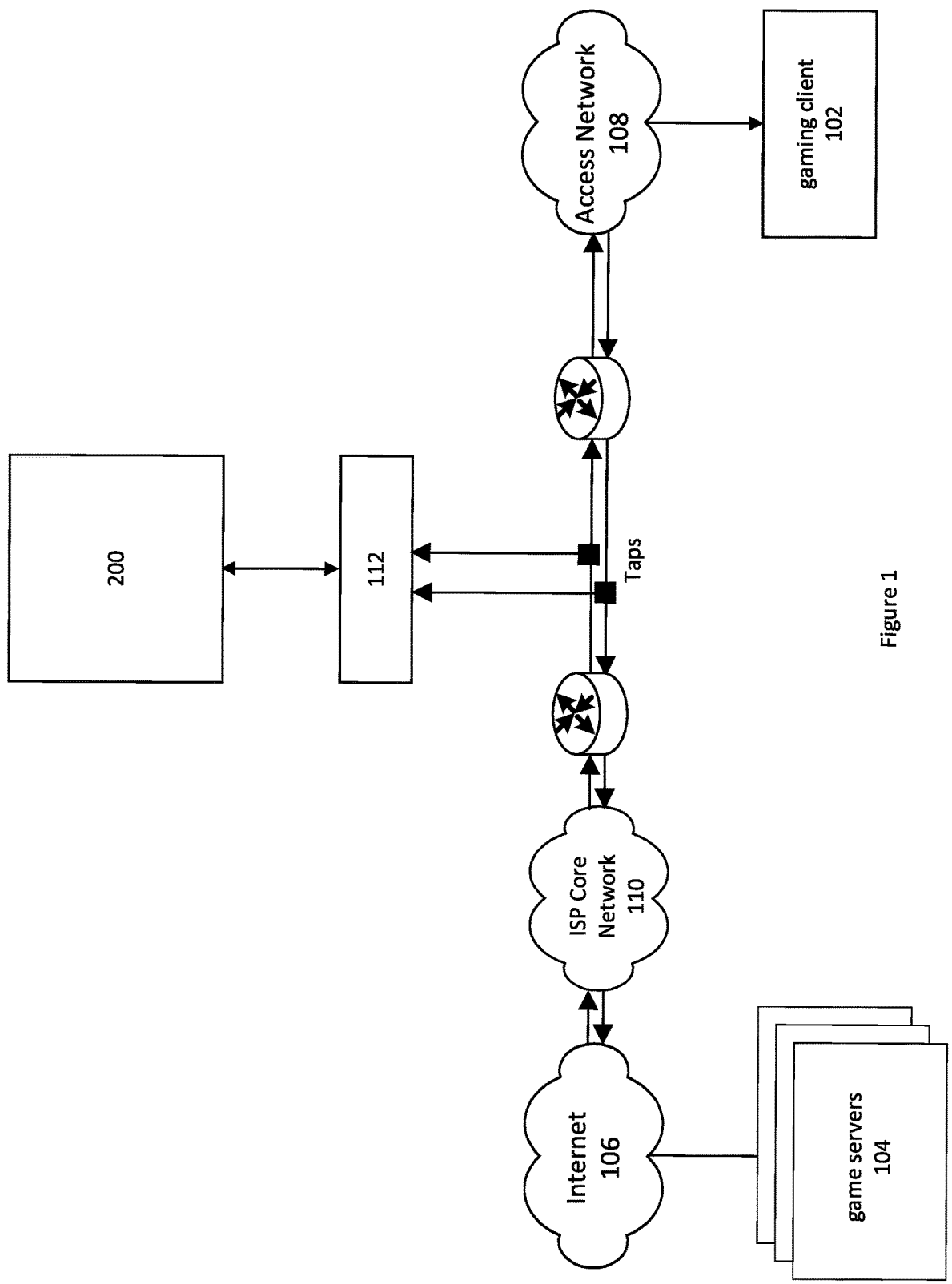
FIG. 1 is a schematic diagram illustrating an embodiment of the present invention in the context of an ISP network.

Applying the apparatus to an ISP network as shown in FIG. 1 enables the ISP to have insight into the gaming experiences of its users. In turn, this allows the ISP to adjust its network accordingly to ensure that its users have a desired quality of experience of online gaming, or to quantify the impact of network events and/or changes on its gaming customers. However, although embodiments of the present invention are described herein in the context of an ISP network, other embodiments may be utilised in other network contexts. For example, embodiments of the invention can be deployed in a university campus, or in a game developer's network to assess the quality of experience of gamers playing games built by the developer.

As shown in FIG. 1, online gaming generally refers to an arrangement wherein game servers 102 serve computer game content to game clients 104 via a wide-area communications network 106 such as the Internet. Typically, each game client 104 is connected to the Internet 106 via the game client's corresponding Internet Service Provider's (ISP's) access network 108 and core network 110. Thus, although FIG. 1 shows only one ISP access network 108 and core network 110, in general there may be several or many such ISP networks for different participants in any single online multiplayer game session.

In accordance with the described embodiments of the present invention, an apparatus 200 for estimating user experience of online gaming, as shown in FIG. 2, is added to the network so that it can access online game network packets flowing between each game client 104 and the corresponding game server(s) 102. In the described embodiments, this is achieved in a passive and non-disruptive manner by adding optical network taps to optical links between the ISP's access network 108 and core network 110, as shown in FIG. 1, so that a copy of each network packet flowing in either direction is copied to a high speed switch 112 that is able to selectively forward online gaming packets to the apparatus 200, as described below.

The apparatus 200 executes a process 300 for estimating user experience of online gaming, as shown in FIG. 3, that monitors network traffic at the ISP level to detect packets of online game sessions, identifies the specific online game of each session, and measures the arrival times of packets for each online game user session; that is, for each packet to and from each user's gaming client 104, and processes those measurements to periodically generate corresponding jitter values that are representative of the user's online gaming experience over time. As described above, online gaming is extremely sensitive to variations in latency, and it is extremely important for the online gaming experience to be positive in order for an ISP to attract and retain online gaming customers.

In the described embodiments, the high speed switch 112 is a NoviSwitch NS-2122 SDN switch, and the apparatus 200 is embodied as an IA-64 blade server to facilitate parallel processing of network packets, and the process 300 executed by the apparatus 200 is implemented as executable instructions of one or more software modules 202 stored on non-volatile (e.g., hard disk or solid-state drive) storage 204 associated with the blade server, as shown in FIG. 2. However, it will be apparent that at least parts of the process 300 can alternatively be implemented as configuration data for one or more field-programmable gate arrays (FPGAs), and/or as one or more dedicated hardware components, such as application-specific integrated circuits (ASICs), for example, or as any combination of these different forms.

Each blade includes its own random access memory (RAM) 206 and at least one processor 208 (only one instance of each being shown in FIG. 2 for simplicity of illustration), and the blade server includes external interfaces 210, 212, 214, all interconnected by a bus 216. The external interfaces include at least one network interface connector (NIC) 212, and may further include universal serial bus (USB) interfaces 210, at least one of which may be connected to a keyboard 218 and a pointing device such as a mouse 219, and a display adapter 214, which may be connected to a display device such as an LCD panel display 222.

In the described embodiments, the software modules 202 of the apparatus 200 include a high-speed packet processing engine 226 written in Golang (for concurrency and parallelism), built over the open-source Network Functions Framework NFF-GO 228, available from https://github-.com/intel-go/nff-go. The packet processing engine also makes use of DPDK (Data Plane Development Kit) 230 available at https://www.dpdk.org to achieve high packet processing speeds of up to 20 Gbps using only 4 CPU cores. The packet processing engine 226 maintains state both at the flow level (to detect game set-up connections) and also at the host level to track byte counts, packet counts, port numbers/ranges, TCP/UDP sessions, and numbers of flows. A gaming detection and identification component 232 is implemented on top of the stateful packet packet processing engine 226, and leverages the attributes extracted by the packet processing engine 226, as described below.

As shown in FIG. 3, the process 300 for estimating user experience of online gaming begins with the switch 112 receiving raw network packets from the optical taps at step 302, and at step 304 the switch 112 performs a lookup to see whether the received packets match a network flow for an online game session previously defined in its forwarding tables. A new game session will not have a matching entry, and consequently the switch 112 forwards the packets to the gaming detection and identification component 232 at step 316.

The gaming detection and identification component 232 executes a gaming detection and identification process 400, as shown in FIG. 4. After receiving packets of a network flow at step 402, the packets are inspected to determine whether they initiate one or more TLS connections at step 404. If not, then the process 400 loops back to wait for more packets at step 402. Otherwise, the process 400 proceeds to extract a list of one or more Server Name Indications (SNIs) of the one or more TLS connections at step 406. A lookup is performed at step 408 to determine whether the list of one or more extracted SNIs is known, as described below. If the extracted SNI list is unknown, then the process 400 loops back to wait for more packets at step 402. Otherwise, the SNI is known, and subsequent UDP flows for the client are inspected to determine additional flow attributes at step 410, specifically the server-side UDP port, the upstream packet rate, the downstream packet rate, and flow duration. A look up is then performed at step 412 to determine whether the collected attributes match those of a known game. If not, then the game is not known to the apparatus 200, and the process 400 loops back to step 402. Otherwise, a known game has been identified, and the switch 112 is configured (by inserting corresponding entries into the forwarding table of the switch 112) to send further packets of the online game session to the jitter measurement component 234.

Figure 10:
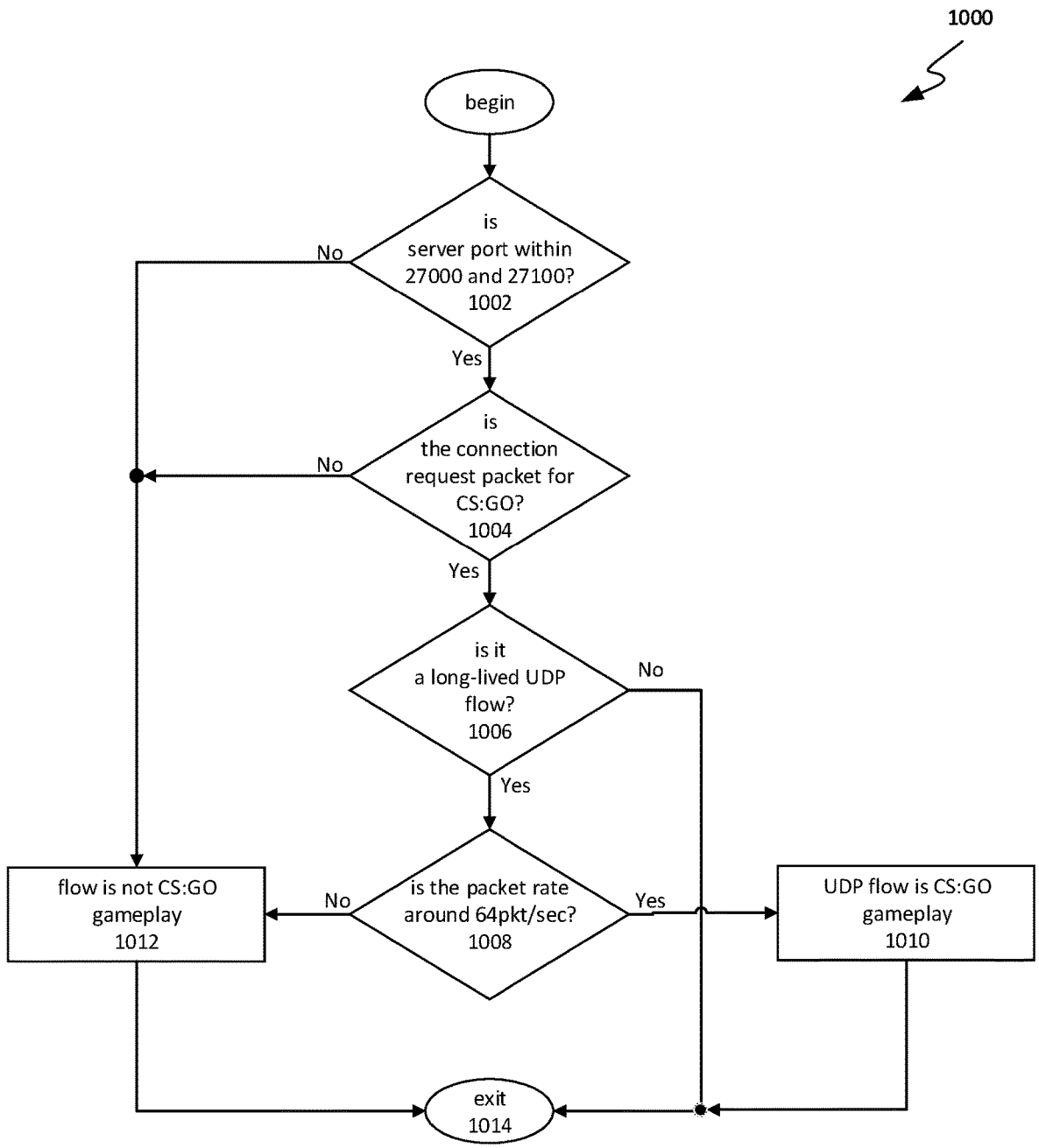
FIG. 10 is a flow diagram of a CS:GO lookup sub-process of a lookup step of the game detection and identification process of FIG. 4.

By way of example, a flow diagram of a CS:GO lookup sub-process 1000 of the lookup step 412 is shown for the specific online game CS:GO in FIG. 10. In practice, there will generally be separate such sub-processes for each online game known to the apparatus 200. The CS:GO lookup sub-process 1000 begins by determining whether the server-side port number is between 27000 and 27100 at step 1002. If it is not, then the process determines that the UDP flow does not represent CS:GO gameplay, and the process exits at step 1014. Otherwise, the process proceeds to step 1004 to check whether the corresponding TLS connection request is to a known CS:GO server. If it is, then the process proceeds to step 1006, to check that the UDP flow is long-lived, as defined below, at step 1006. If it is not, then the process exits. Otherwise, a final check is performed at step 1008 to determine whether the upload and download UDP flow packet rates are both around 64 packets per second. If they are, then the process considers that the UDP flow represents an online gaming session of CS:GO gameplay at step 1010; otherwise, the process determines that the UDP flow does not represent CS:GO gameplay at step 1012. In either case, the process exits at step 1014.

The jitter measurement component 234 executes a jitter measurement process 500, as shown in FIG. 5, which begins by counting network packets of the online game session over a first time period at step 502. Additionally, the arrival times of a subset of the counted network packets arriving in a second time period within the first time period are measured at step 504. The average time between the counted network packets is determined at step 506 by dividing the elapsed time between the first packet and the last packet by the counted number of network packets over that same period. Then, at step 508, the 'ideal' arrival times of the packets in the subset of packets are calculated based on the arrival time of the first of the packets in the subset and the average time between packets calculated at step 506. This allows the deviation of the arrival time of each packet of the subset to be calculated at step 510 as the difference between the ideal arrival time of that packet and is actual measured arrival time. The calculated deviations of each packet in the subset are then averaged at step 512 to determine a corresponding 'jitter' value 514 of the second time period as the calculated average value.

The first and second time periods are then updated by shifting or 'sliding' them forward in time by a predetermined amount at step 516, and the process 500 loops back to step 502 to count the network packets of the game session over the updated first time period, and steps 502 to 512 are repeated to generate successive values of jitter 214 as a function of time, and in real-time. Thus, the calculated jitter values 514 are quantitative real-time measurements of the jitter of network packet flows of the game session, and are representative of the user's real-time experience of the online game. The ability of an ISP to measure the real-time user experience of online games allows the ISP to monitor the performance of its network to ensure that it meets user expectations, and to measure the effect of network events or configuration changes on gaming user experience.

As described below, embodiments of the present invention have been applied to quantify user experience of the 50 most popular online games available today, as shown in Table 1 below. These games represent a good mix of different game genres, including Shooting (first person shooter ("FPS") or third person shooter "TPS"), Real-Time Strategy ("RTS"), and Sports, and also represent a wide variety of game developers and distributors as shown in the last two columns. For the sake of brevity, only one representative game from each of these three genres is described below and its network behaviour determined by collecting and analysing game-play network traces.

TABLE 1

The 50 Most Popular Online Games (FPS/TPS, RTS, Sports)

| Game | Genre" | Interaction | Developer | Distributor/Publisher |
|---|---|---|---|---|
| Fortinite | Shooter | Third Person | Epic Games | Epic Games |
| Call of Duty: Modern Warfare | Shooter | First Person | Infinity Ward | Blizzard Entertainment |
| World of Warcraft | RTS | Omnipresent | Blizzard Entertainment | Blizzard Entertainment |
| League of Legends | MOBA | Omnipresent | Riot Games | Riot Games |
| Rainbow Six: Siege | Shooter | First Person | Ubisoft Montreal | Ubisoft |
| Destiny 2 | Shooter | First Person | Bungie | Steam |
| Path of Exile | Hack and Slash | Third Person | Grinding Gear | Games Steam |
| Apex Legends | Shooter | First Person | Respawn | Entertainment Origin |
| Overwatch | Shooter | First Person | Blizzard Entertainment | Blizzard Entertainment |
| CS:GO | Shooter | First Person | Valve Corp. | Steam |
| Payday 2 | Shooter | First Person | Overkill Software | Steam |
| Monster Hunter World | Action RPG | Third Person | Capcom | Steam |

TABLE 1-continued

The 50 Most Popular Online Games (FPS/TPS, RTS, Sports)

| Game | Genre" | Interaction | Developer | Distributor/Publisher |
|---|---|---|---|---|
| Borderlands 3 | Shooter | First Person | Epic Games | Epic Games |
| DoTA2 | MOBA | Omnipresent | Valve Corp. | Steam |
| NBA 2k20 | Sports | Omnipresent | Visual Concepts | 2K Sports |
| FIFA 20 | Sports | Omnipresent | Electronic Arts | Origin |
| Madden NFL 20 | Sports | Omnipresent | Electronic Arts | Origin |
| Need For Speed: Heat | Racing | First/Third Person | Electronic Arts | Origin |
| Rocket League | Sport | Third Person | Psyonix | Steam |
| PUBG | Shooter | First Person | Bluehole | Steam |
| PUBG Mobile | Shooter | Third Person | Tencent Games | Tencent Games |
| Call of Duty Mobile | Shooter | Third Person | Tencent Games | Activision |
| Halo Reach | Shooter | First Person | Bungie | Microsoft Studios |
| Battlefield V | Shooter | First Person | Electronic Arts | Origin |
| Division 2 | Shooter | Third Person | Massive Entertainment | Ubisoft |
| Warframe | Shooter | Third Person | Digital Extremes | Steam |
| Hearthstone | Card/Turn-based | Omnipresemt | Blizzard Entertainment | Blizzard Entertainment |
| Dead By Daylight | Horror | First Person | Behaviour Interactive | Steam |
| Left4Dead 2 | Horror | First Person | Valve | Steam |
| Sea of Thieves | Action | First Person | Rare | Microsoft Studios |
| Battlefield 1 | Shooter | First Person | DICE | Origin/EA |
| Final Fantasy XIV | MMORPG | Third Person | Square Enix | Square Enix |
| Minecraft | Sandbox | First Person | Mojang | Mojang |
| Ghost Recon: Breakpoint | Shooter | Third Person | Ubisoft | Ubisoft |
| Anthem | Shooter | Third Person | Bioware | Origin |
| Paladins | Shooter | First Person | Evil Mojo Games | Steam |
| Gears 5 | Shooter | Third Person | The Coalition | Xbox Game Studios |
| Escape From Tarkov | Shooter Survival | First Person | Battlestate Games | Battlestate Games |
| Mortal Kombat 11 | Fighting | Third Person | NetherRealm Studios | Steam/Warner Bros. |
| Tekken 7 | Fighting | Third Person | Bandai Namco | Steam |
| DoTA Underlords | Auto Battler | Omnipresent | Valve Corp. | Steam |
| League of Legends: TFT | Auto Battler | Omnipresent | Riot Games | Riot Games |

FPS/TPS (First-Person Shooter/Third-Person Shooter) Genre Example: Fortnite

Fortnite is a third-person shooter (TPS) game developed by Epic Games, and was the highest grossing game in 2018 and 2019, at $2.4 and $1.8 billion, respectively. It started as a shooter-survival cooperative game where members of a team fight zombie-like creatures and protect their fort-like structures. However, it has since risen in popularity with a game mode called Battle Royale wherein 100 players fight each other to be the last one standing, and it has recently added a creative world mode where players can create unique worlds and battle arenas. Though the game is free to play, users can pay to buy virtual currency (VBucks) which is used to purchase emotes, character models, and skins to change visual appearance (of the character, weapons, and backpacks). The game is frequently updated, and has attracted over 125 million players in under two years. To handle such scale, Epic Games have distributed the game services on the Amazon Web Services (AWS) cloud globally to offer a low-latency experience to players.

Figure 6:
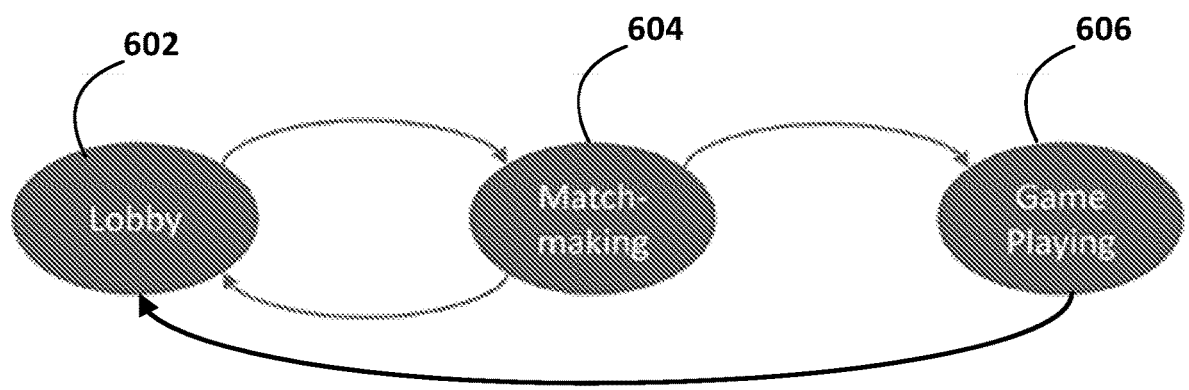
FIG. 6 is an illustration of a state machine representing states of the popular online game known as Fortnite.

User Interaction: A user first logs in to the Epic Games Launcher and which runs the Fortnite game client. The client starts the game after downloading any recent updates. As shown in the state representation of FIG. 6, the game starts in a 'lobby' where users have access to their social network, collectibles, player statistics, game settings, etc. When the user decides to play, the client contacts Fortnite's matchmaking servers, which groups players waiting in a queue and assigns a server on which the online game runs. Subsequently, the match starts and lasts about 20 minutes, depending on the chosen game mode. After the game, the user returns to the lobby area where they may choose to start another game.

Network Behaviour: The client communicates with various service endpoints shown in Table 2 below, which provide services such as lobby, matchmaking, in-game chat, etc. These are provided over encrypted TLS connections, and are precursors to actual game-play. Once the game starts, the actual game-play traffic is over a UDP stream to a game server whose IP address does not have a corresponding DNS entry; the inventors therefore believe the server IP address is fetched over the encrypted connection during the matchmaking process. The game-play UDP stream has a packet rate of 30-40 pkt/sec (packets per second) upstream, and around 30 pkt/sec downstream. Users can enable a network information panel in their settings ("NET DEBUG STATS") to view network performance metrics such as ping, packet loss, and upload and download transfer rates. When the game ends, the UDP stream stops, and the player returns to the lobby state.

The other FPS/TPS games (as shown in Table 1 above) showed generally similar patterns of user interaction and game states. Their underlying network behaviour also entails contacting lobby/matchmaking services (which are useful indicators as precursors to game commencement as described below), and game-play occurs predominantly over UDP flows (although the game Division 2, for example, uses TCP), though the packet rates can be varying: for example, the game CS:GO generates a fixed packet rate of 64 pkt/sec in each direction, whereas the game Apex Legends has a variable packet rate that starts high (at around 60 pkt/sec) and drops (to around 30 pkt/sec) as the game progresses.

TABLE 2

Fortnite Services

| Service | SNI | Purpose |
|---|---|---|
| Launcher | launcher-public-service-prod06.ol.epicgames.com | Epic games launcher for login and authentication |
| Waiting Room | fortnitewaitingroom-public-service-prod.ol.epicgames.com | The user decides the game mode |
| Party | party-service-prod.ol.epicgames.com | Lobby area to invite friends to play together |
| Social Network | Friends-public-service-prod.ol.epicgames.com | In-game social network |
| Matchmaking | fortnite-matchmaking-public-service-live-prod-b.ol.epicgames.com | Groups waiting players to start a match |
| Anti-cheat | hydra.anticheat.com | Third-party service to prevent cheating |
| Data reporting | data-router.ol.epicgames.com | Anonymous stats reporting for analytics purposes |

RTS (real-time strategy) genre example—DotA 2

Defence of the Ancients 2 ("DotA2") is a free-to-play Real-Time Strategy ("RTS") game, developed by Valve and offered via the Steam distribution platform. DotA2 was released in 2009 and has consistently remained one of the most played games as per the Steam Charts—with over 12.6 million players and an estimated revenue of $406 million in 2017. A multiplayer match partitions players into two teams of five that compete to destroy the opposing team's base. The game makes use of skill-based matchmaking wherein servers owned by Valve Corporation are used to connect players online.

User Interaction: The game is launched via the Steam client, and follows a state-machine similar to the Fortnite state machine shown in FIG. 6. The game first enters into a Lobby state wherein the player can change skins, configure settings, select game-mode, and wait to start a match. In this state, the game client was observed to ping a set of (about 10) servers to establish a baseline latency value for each server. The pinging is performed over UDP (as opposed to ICMP), with a 416 byte ping packet and a 41 byte reply. For each server, a burst of 10 pings is sent with a spacing of 0.5 s (the inventors suppose that the client takes the average of the RTTs calculated from this burst). Since no DNS responses were observed to contain the IP addresses of the contacted servers, the inventors believe that the list of servers is fetched when the game client is opened using an encrypted TLS connection to api.steampowered.com.

Network Behaviour: When the player decides to play, the game enters a matchmaking state, and the server latencies are updated with another burst of pings. Two "connection request" packets (UDP payload size 295) were sent to the two servers with the lowest latencies. Both servers respond with a 17 byte "connection accept" packet, and the client connects to the one that responds first by sending a "connection ack" packet of size 295 bytes. Subsequently, the map of the arena where the match is about to occur is loaded locally onto the player's machine, and the game-play begins.

During the game-play, one continuous UDP stream (identified by 5-tuple) is used for the entire session (UDP packets are of varying sizes), and it is the same stream that was initially used for the server pinging and connection handshake. During the game-play, the server sends packets at a fairly fixed rate of 30 pkt/sec, containing aggregated state updates on the position of other players and damage dealt/received. Similarly, the client sends packets to the server to update the player's position and actions in the game, also at a fixed rate of 30 pkt/sec. Other RTS games such as League of Legends and Starcraft are observed to have similar behaviour to DotA2. In general, RTS games have lower packet rates during game-play than FPS/TPS, since the latter typically require higher rates of user input.

Sports Genre example: FIFA Online 3

FIFA Online 3 ("FO3"), a free-to-play multiplayer football game developed by Electronic Arts Seoul Studio is primarily played in Asia, and is distributed by different publishers depending on region. The English version distributed on the Garena gaming platform is commonly played in Singapore, Malaysia and India. In FO3, players create their football team by customizing from over 15,000 real players and 30 leagues. They then play one-on-one matches with other players online, where the player controls their team from a top-down view. The winner is rewarded with ranking points and in-game currency which is used to buy better players and improve their team.

User Interaction: A user first logs into the Garena game client and launches FO3. The game starts in a free-play mode where the player can practice the game offline, customize teams and strategies, and buy/sell players in the market. Once the player is ready to play online, the multiplayer mode creates a match with a randomly selected player of similar level. The game typically lasts 15 minutes, after which the user may choose to return to the lobby, or re-match with the same opponent.

Network Behavior: The Garena client firsts connects to game.garena.com to perform user login. Upon launching the game, the client first checks for any available updates to the game by contacting Garena's CDN servers (using HTTPS) which are hosted on the Akamai CDN (content delivery network) cdngarenanow-a.akamaihd.net. The client also establishes a persistent HTTP connection to dl.garenanow.com which is used to download static assets such as images, etc. After this, the client establishes a persistent TLS connection to live.fo3.garenanow.com for game specific online services such as match-making and player market actions. When the user decides to play an online match, the client exchanges data on this connection, and subsequently a new UDP stream is established for game-play. The server IP of the UDP stream seems to be fetched in the encrypted data connection, as it has no corresponding DNS entry or any other apparent source. This UDP stream has an upload/download packet rate of around 32 pkt/sec. At the end of the game, the user can choose to re-match, which happens over a new UDP stream, or return to the lobby.

The above descriptions show that most online games follow a very similar pattern of user interaction and corresponding network behaviour, with differences in the servers they connect to and the packet rates during game-play. There are some exceptions, such as World of Warcraft, that use TCP for game-play.

Attributes

Figure 12:
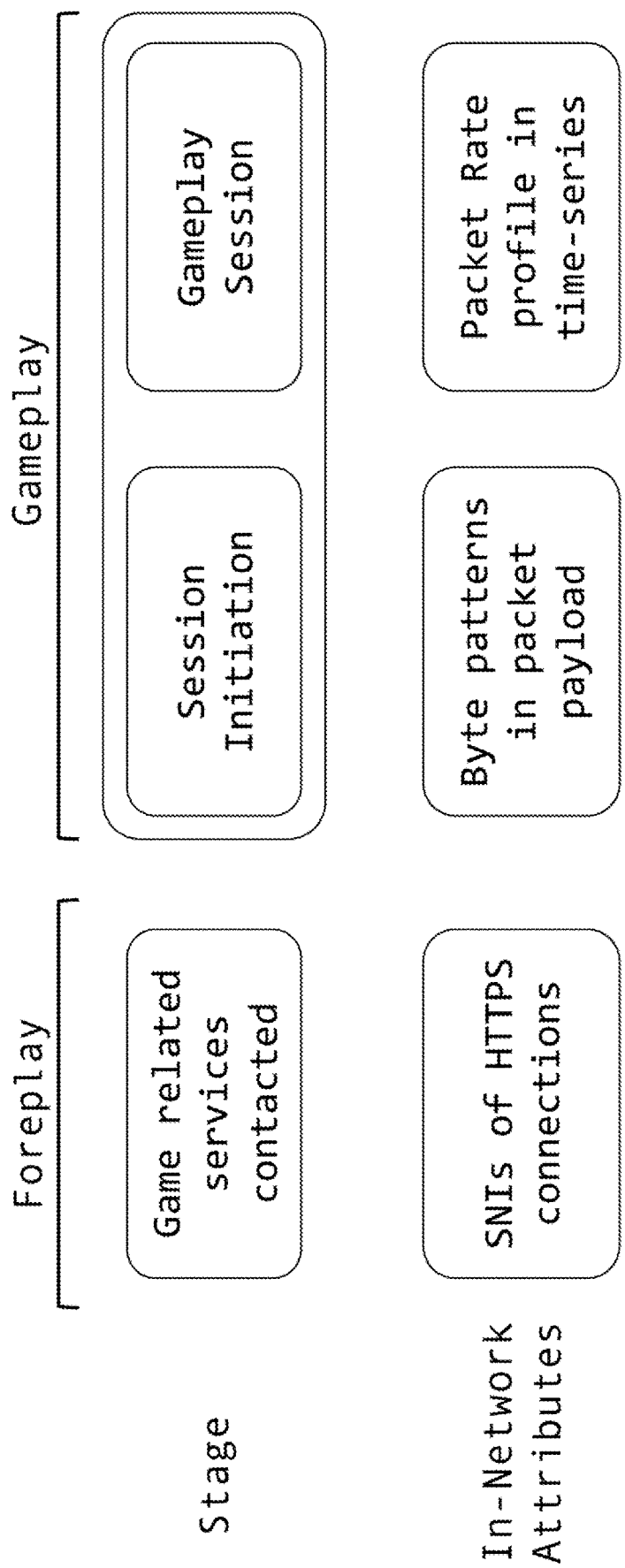
FIG. 12 is a schematic diagram illustrating the game attributes of the pre-gameplay ("foreplay") phase/stage, the session initiation phase/stage, and the gameplay phase/stage of games used to identify specific games.

As described above, online games start in a pre-gameplay or 'fore-play' phase, contacting several game-related services prior to commencing an actual gameplay session. Accordingly, the observed network activity (HTTPS connections, UDP/TCP game-play flow(s)) is used to extract relevant features and attributes that identify individual games. Significantly, most games do not provide any DNS query corresponding to the server IP address and thus are difficult to isolate and detect in a wild network. However, the systematic monitoring of various network flow attributes collected across the different phases of a game, as shown in FIG. 12, are used to generate models that detect and identify specific games with high accuracy.

Prior to actual game-play, each game client contacts various services over HTTPS to perform functions related to login, social media, purchase stores, and the like. Some games (e.g., Fortnite) explicitly contact different services for the respective functions (as described above), whereas some games contact only one service (e.g., CS:GO and DoTA2 both contact only api.steampowered.com). Nonetheless, these indicators provide enough information to identify the game distributors and/or developers, if not the actual game itself. Accordingly, the names of these service endpoints are extracted by parsing the Server Name Indication (SNI) field present in the TLS handshake packets of HTTPS flows. Thus, even before a host starts a game, the list of SNIs extracted (from HTTPS flows) during the pre-gameplay phase can provide at least contextual information around the game that is about to be played (and in some cases the specific game itself!). Having determined this context, attributes that help identify the game are extracted.

After a match has been setup in one of the game servers (through matchmaking services as described above), the game client subsequently connects to the game server hosting a match. The resulting connection/flow provides the data for the actual game-play. The first few packets of this flow usually represent some form of proprietary handshake mechanism. Due to the fixed nature of handshakes, some repetitive and idiosyncratic patterns emerge in the first few packets for each game, as summarised in Table 2 below for selected games. Some games (e.g., Apex Legends) do not have any fixed byte patterns, although the first few packet payload lengths of the UDP flow are always fixed (similar patterns are also found in PUBG Mobile). These patterns in the session initiation stage have the ability to uniquely fingerprint and isolate the flows responsible for game-play.

After the handshake, as the match begins, different games have different behavioural patterns in their packet rates. For example, CS:GO has a fixed bidirectional packet rate of 64 pkt/sec, and similarly DoTA2 has a fixed packet rate of 32 pkts/sec, whereas Fortnite, Apex Legends and CoD Mobile all have a variable packet rate within the range of 30-60 pkts/sec. Even within a game, different game modes can have different packet rates. For example, in the case of CoD: Modern Warfare, its 'Ground War' game mode (32v32 players) has a downstream packet rate of 20 pkts/sec, and its smaller scale 'Team Deathmatch' mode (6v6 players) has a downstream packet rate of 60 pkts/sec. In the case of Overwatch, the packet rates spike up to 120 pkts/sec (as opposed to the regular 60 pkts/sec) for one second every time the player dies in the match due to the 'kill cam' data being sent as a burst.

Thus, by monitoring the pre-gameplay SNI list, the packet payload patterns during game initiation, and the flow rate profiles, the apparatuses and processes described herein can detect which specific game is being played from its network activity. However, it is a non-trivial task as the list of SNIs does not always lead to a singular possible game which means that in the subsequent packets, the payload patterns corresponding to all possible games have to be checked in parallel. For example, consider a scenario where both CS:GO and DoTA2 are possible candidates indicated by the SNI list, the apparatus needs to inspect the packets for the signatures of both CS:GO and DoTA2. If the signature of CS:GO is present in the first 2 packets and the signature of DoTA2 is present in the 5th and 6th packet, then even after looking at the first two packets that indicate CS:GO, the apparatus/process still has to wait for the 5th and 6th packet to confirm that the game is not DoTA2.

Discovery of Unknown Games

The embodiments of the present invention described above are able to detect online gaming sessions of known online games whose network flow attributes (collectively referred to herein as a 'gameFilter') have been measured previously. In an alternative embodiment, the apparatus and process are able to detect online gaming sessions of unknown games; i.e., online games whose network flow attributes have not yet been measured or otherwise determined. This is possible because the inventors have determined that all online gaming sessions share certain network flow attributes, as described below. In some embodiments, it may be sufficient to simply identify which network flows are flows of online gaming sessions, without identifying specific online games. However, in other embodiments, it may be desired to further analyse the network flows of those sessions to determine additional network flow attributes that can be used to identify the specific online game being played. In general, this is best achieved by determining these attributes over multiple online gaming sessions to allow for possible variations in those attributes.

Figure 11:
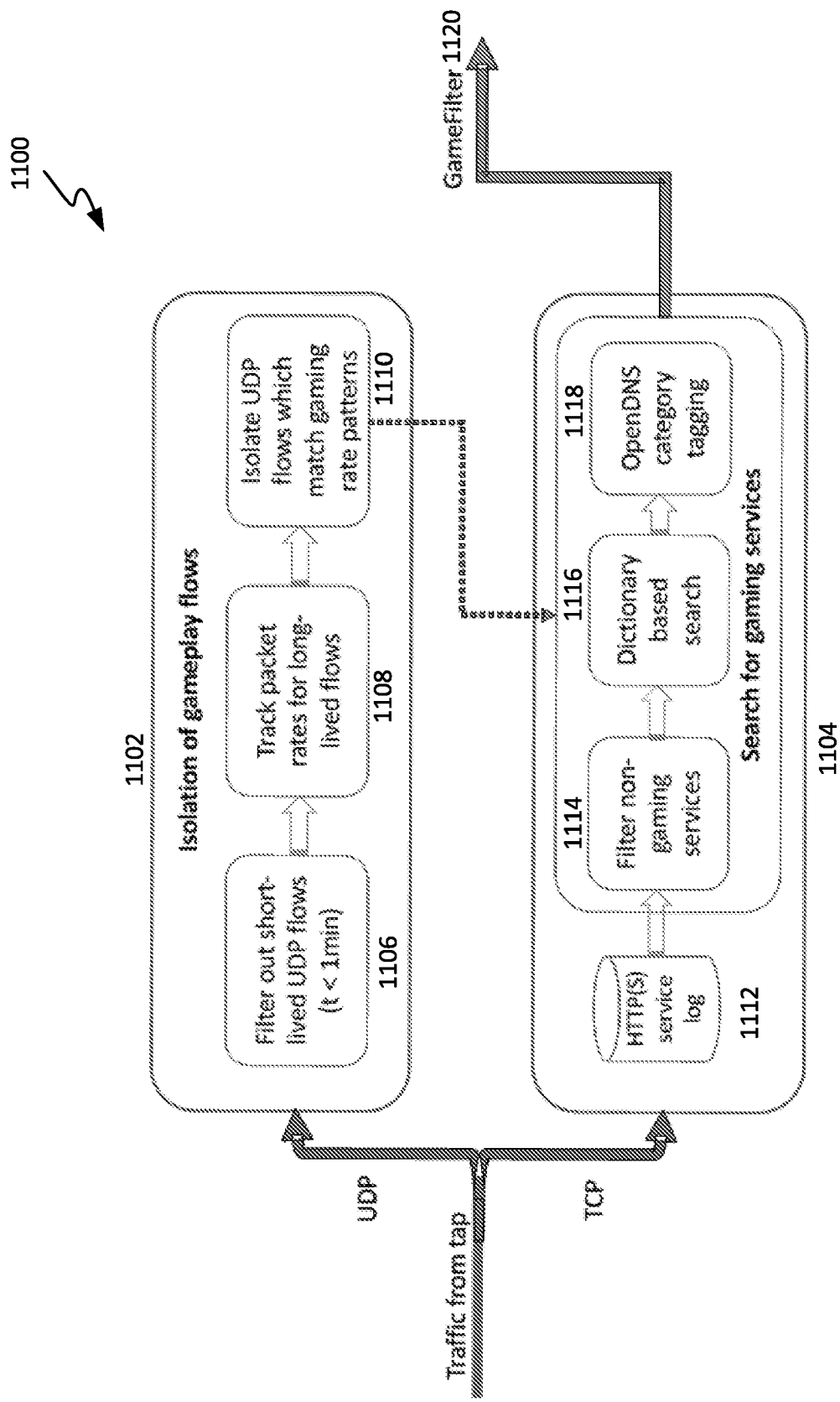
FIG. 11 is a block diagram of game discovery components of an alternative embodiment of the present invention.

In any case, the ability to detect online gaming sessions is provided by including game discovery components, as shown in FIG. 11, which process network flows to identify flows representing online gaming sessions, and then further process those flows to generate, for at least one unknown game, a corresponding gameFilter, being a set of network flow attributes that uniquely identifies network flows as belonging to sessions of a specific corresponding online game.

As shown in FIG. 11, the game discovery components 1100 include UDP analysis components 1102 and TCP analysis components 1104. A gameplay session of most online games uses a UDP (User Datagram Protocol) flow to exchange information between the game client and a corresponding game server. The inventors have analysed UDP flows of many online games, and have made the following observations: (a) the duration of gameplay UDP flows is always longer than one minute, (b) the UDP flow packet rate is approximately constant in both upstream (client→server) and downstream (server→client) directions and (c) for most (but admittedly not all) online games, the average UDP packet size is smaller than the MTU. The inventors have determined that this pattern of activity is unique to online gaming and is can therefore be used to discover new games as described below.

The high-level operation of the game discovery components 1100 is as follows. The network traffic received from the optical tap is split into UDP and TCP portions as determined from the transport layer header of each IP packet. Since online game sessions occur over UDP, the UDP analysis components 1102 analyse the received UDP packets to identify and isolate "potential gameplay flows". Similarly, the TCP traffic is analysed by the TCP analysis components 1104, which extract, from packets, the logs 1112 of all the internet HTTP(S) services accessed by clients. A "potential gameplay flow" is identified from the UDP traffic by the UDP analysis components 1102, and the service logs 1112 are then searched for any corresponding game-based services being accessed by the host minutes prior to initiating the identified potential gameplay flow. If the search finds such a gaming service, then the corresponding game has been successfully discovered, and the gameplay session data is processed to generate a new GameFilter. The components that perform these steps are described in detail below.

Isolation of Gameplay flows

The UDP portion of the network traffic received from the optical tap consists of network flows of multiple UDP applications used by internet subscribers, including voice calls, conferencing, and remote desktop, for example. Online gaming sessions are isolated by filtering out non-gaming flows as follows. First, all UDP flows with durations of activity less than a time threshold T are discarded. The packet rates of the remaining (and deemed to be) long-lived flows are then determined by monitoring flow level state. After each remaining flow expires, statistical measures of its packet rates are then generated and compared to respective threshold values of those same statistical measures to determine whether the flow represents an online gaming session.

In some embodiments, the statistical measures are the mean and standard deviation of the statistical distribution of UDP packet rates. However, it will be apparent to those skilled in the art that other statistical measures may be used in other embodiments, provided that they are characteristic of online gaming sessions and not of other types of UDP network flows.

In one embodiment, a gaming flow identification component 1110 identifies a UDP network flow as potentially representing an online gaming session if its mean packet rate $\mu_{flow}$ is in a predetermined range between $\mu_{min}$ and $\mu_{max}$, i.e. $\mu_{min} < \mu_{flow} < \mu_{max}$, and its standard deviation $\sigma$ is less than a threshold value $\sigma_{thresh}$. In one embodiment, the values of $\mu_{min}$, $\mu_{max}$ are about 20 and 70 packets per second, respectively, and the standard deviation $\sigma$ of the determined packet rates is about 10 packets per second. If an UDP network flow has these characteristics, then the gaming flow identification component 1110 prompts the TCP analysis components 1104 to search for one or more corresponding game services contacted by the host from whom the gameplay-like flow originated, as described below.

Search for Gaming Services

The TCP portion of the traffic contains TLS handshake packets (representing the handshake that precedes the establishment of a secure HTTPS connection). The handshake packets are parsed to extract the SNI (server name indication) that identifies the corresponding service being contacted by the client. The HTTP service log 1112 contains logs of services contacted by all clients in the network.

Upon isolation of a potential gameplay flow, a gaming service filter component 1114 searches for gameplay related services contacted by the client whose UDP flow has been The gaming service filter component 1114 begins by looking at the services contacted within a window of k minutes prior to the establishment of the gameplay UDP flow, where k is a value between 5 and 10 minutes. If k is too low, some gameplay services might not be captured, and if k is too high, the list of services would be very long and hence will delay the processing. In practice, this list of services typically contains many non-gaming services, and these are removed based on frequency of occurrence. The frequency of occurrence is computed on the entire HTTPS log and the top k (which is 500 in one embodiment, but can be any value from about 100 to about 1000) non-gaming services are marked to be removed. Whether a service is gaming-related or not is determined by checking the category using the Category Tagging available in the OpenDNS tool. The basis for this methodology is that if multiple hosts are contacting the same service within the time window, then it is less likely to be a gaming service. After performing this initial filtering, a dictionary searching component 1116 accesses a gaming dictionary containing lists of popular games, game developers and game distribution platforms and performs a string search on these gaming services. Further, a game tagging component 1118 uses OpenDNS tagging to receive a category of a service being contacted. For example, www.google.com would be ignored as it is categorized as "Search Engine", whereas origin.com is categorized as "Gaming". Thus these components 1116, 1118 identify game-related services being contacted by the client prior to gaming. The data gathered by each of the components is processed and aggregated to generate a GameFilter, the contents of which are described below. The GameFilter for this session of a newly discovered game is provided as an output.

GameFilter

A GameFilter for a game includes a list of the gaming-services (identified as described above) that the client contacted prior to the game, and the statistical measures of the upload and download packet rates of the corresponding UDP flow of the online gaming session, in one embodiment being the mean and standard deviation of these packet rates.

Each GameFilter is then used to identify future sessions of the newly discovered game which have the same list of services and similar packet rate distribution. This enables building a dataset containing multiple gameplay sessions from the internet traffic which can then be used to generated a more general gameFilter for detecting future sessions of the same game, now that the game has been discovered and its sessions characterised.

Game Detection Model

To accurately and rapidly detect and identify games using the attributes described above, in an alternative embodiment the apparatus and process use a tree model that uses the minimum number of attributes to identify a particular game. The model begins with the superset of all games under consideration, and as attributes become available over time the model reduces the set of possible games and declares the game as identified when the set reduces to a single specific game.

The flow of events for the trained model is as follows. For each client IP address on the network, the model is initialized as the set of possible games that can occur in the network (i.e., all games from the trained dataset). The apparatus then continuously monitors the names of services being contacted (via the SNI field) while checking whether any game-related services are contacted. If such services are found, then the games corresponding to those services are retained in the set of possible games while all others are removed. After at least one game-related SNI is observed, the model then tracks the first few packets of subsequent new flows (filtering TCP/UDP flows as per the games in the subset). Each subsequent flow is processed to search for the known characteristic packet length and byte patterns of each remaining candidate game, and if found then the flow is classified and isolated as the gameplay flow of the corresponding game, and if they do not match the flow is rejected immediately for that game.

Figure 13:
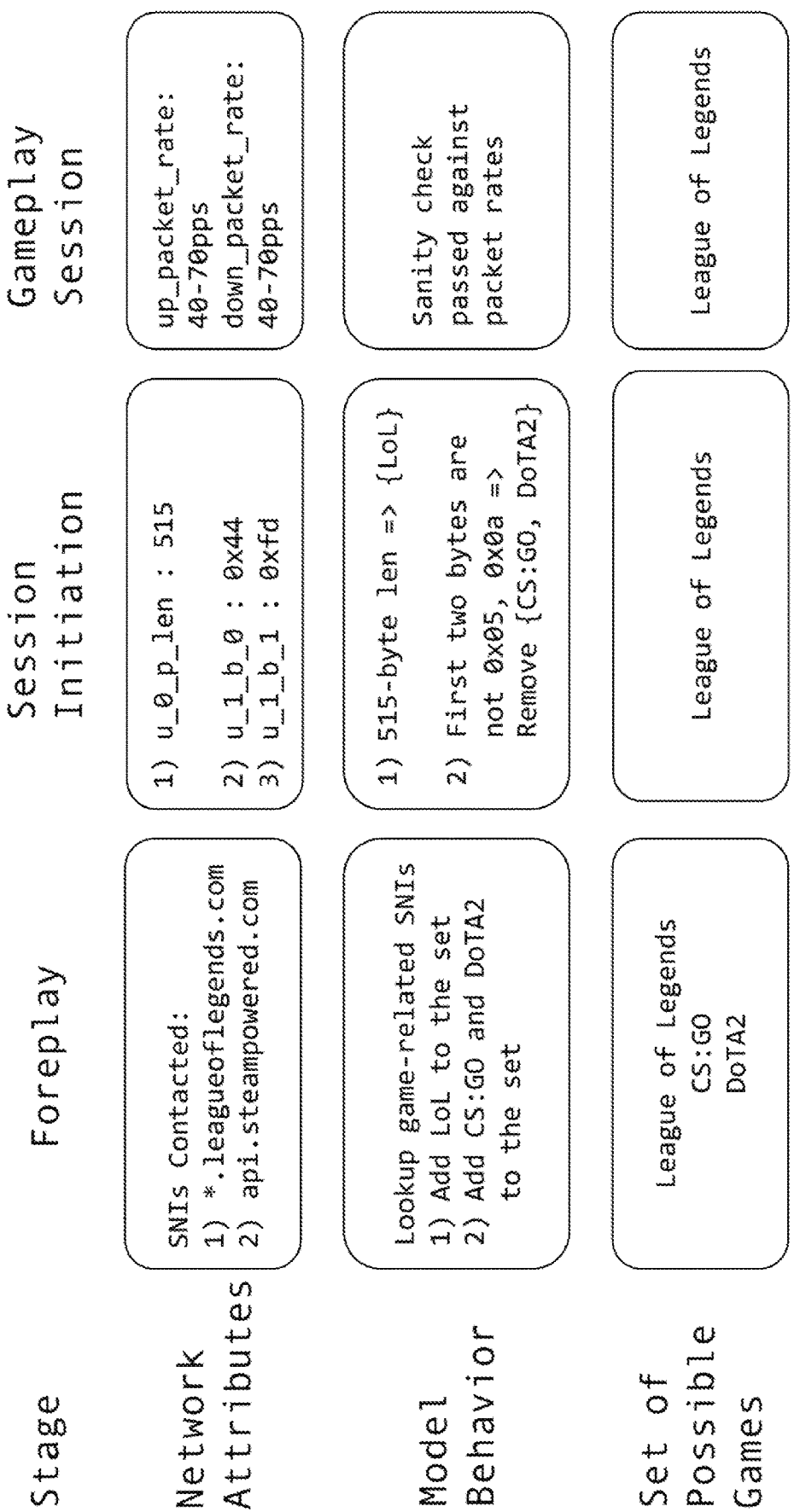
FIG. 13 is a schematic diagram corresponding to FIG. 12, but with specific attributes of different game phases used to identify the game "league of legends"

The following provides a walkthrough of a hypothetical scenario to explain the working of the trained model, with reference to FIG. 13. Consider a gamer (identified by clientIP) who is playing League of Legends (LoL). It is known that the game contacts the SNI leagueoflegends.com when the client starts. However, assume that the gamer left the steam gaming client running from a previous game, and that it resulted in the SNI api.steampowered.com. Thus, the model now has the contextual information from the fore-play that game-play flows could be any of LoL, CS:GO or DoTA2 (refer to Table 2 below for examples of games and their corresponding indicator SNIs and attributes). It is known that the game-play flow of LoL always starts with an upload packet of payload length 515 bytes and that the flows of both CS:GO and DoTA2 start with an

TABLE 2

Examples of Games with their indicator SNIs and attributes (not exhaustive)

| Game | SNI | Session Initiation Attributes | Game-play Rates |
|---|---|---|---|
| Fortnite | fortnite-*.ol.epicgames.com | First 2 packets upstream and downstream have 25-byte payload. First upstream packet payload starts with 0x17 and ends with 0x80. | Up: 30-50 pps Down: 30-35 pps |
| CoD: Modern Warfare | pipes-prod-glutton.public.aws.demonware.net | First 2 packets upstream and downstream have 29-byte payload, First upstream packet payload starts with bytes [0xC, 0x2, 0x0] and corresponding downstream packet payload starts as [0xB, 0x2, 0x0] | Up: 20/60 pps Down: 50-100 pps |
| CoD: Mobile | *.codm.activision.com | First 3 packets upstream have 84, 12 and 12 byte payload and first 3 bytes of first packet upstream are [0x43, 0x1, 0xC0] and corresponding downstream packet are [0x43, 0x2, 0xC0] | Up: 5-30 pps Down: 25-30 pps |
| League of Legends | *.leagueoflegends.com | First 2 packets upstream and downstream have 515 and 107 byte payload respectively. 3rd, 4$^{th}$ and 5th upstream packets have 23 byte payload | Up & Down: 40-70 pps |
| FIFA20 | fifa20.service.ea.com | First 2 bytes in the first upstream and downstream packet are [0x81, 0x01] | Up & Down: 30 pps |
| Battlefield V | *bfv.battlelog.com | Same as FIFA20 | Up: 40-70 pps Down: 60* pps |
| World of Warcraft | worldofwarcraft.com | 1st Upstream Packet Payload has ASCII bytes reading "WORLD OF WARCRAFT CONNECTION - SERVER TO CLIENT - V2" and vice versa for the first downstream packet. | Up & Down: 5-20 pps |
| Apex Legends | r5-pc.stryder.respawn.com | First 2 packets upstream and downstream have 49 and 57 byte payload respectively. | Up & Down: 20-60 pps |
| Titanfall 2 | r2-pc.stryder.respawn.com | Same as Apex Legends | Up: 60 pps Down: 20 pps |
| CS:GO | api.steampowered.com | First 2 bytes of first upstream and downstream packets are 0x05, 0x0a and 0x06, 0x0d respectively. Byte 5-8 (≈gameID) of first dowstream packet are {0x2e, 0x4d, 0x64, 0x79}. | Up & Down: 64 pps |

TABLE 2-continued

Examples of Games with their indicator SNIs and attributes (not exhaustive)

| Game | SNI | Session Initiation Attributes | Game-play Rates |
|---|---|---|---|
| DoTA2 | api.steampowered.com | First 2 bytes of first upstream and downstream packets are 0x05, 0x0a and 0x06, 0x0d respectively. Byte 5-8 (≈gameID) of first dowstream packet are {0x00, 0x42, 0x06, 0x0a.} | Up & Down: 32 pps | upstream packet with the first two bytes of the payload being 0x05 and 0x0a. The model checks for the attributes extracted from the first packet of a new UDP flow (all the games in the subset carry gameplay traffic only in UDP). It finds that it is an upstream packet with a payload length equal to 515 bytes. Since this is an attribute of the LoL game, it retains the game in the set of candidate games. Next, the model checks the attributes of CS:GO and DoTA2 (namely the first two bytes). The byte pattern doesn't match with the game signature. The model immediately removes CS:GO and DoTA2 from the set of candidate games for that flow, and thus detects it to be a gameplay flow of League of Legends. If it had actually been a game play flow for CS:GO, then the model would check the length of the packet which would not be 515 bytes, and was therefore removed LoL from the set of candidate games. It would further check the attributes (of the first downstream packet once it arrives) to distinguish between CS:GO and DoTA2 as they have a 4 byte identifier unique to each game in the first downstream packet.

Having described above how the model is used to identify a specific game from a set of known games, the following describes how an unknown game is added to the model, while also describing the data structures and the model operation in more detail. Consider the addition of the game Titanfall 2 (a relatively new FPS game developed by Respawn Entertainment) to an existing model that already knows the relevant attributes of the game Apex Legends (an older FPS game developed by Respawn Entertainment). This particular example was chosen because the "netcode" of Titanfall is very similar to Apex Legends, thus matching the session initiation patterns. This helps to demonstrate how the model, by using all the contextual data, is able to detect and distinguish between both of these games. In order to train the model, packet traces of multiple sessions of Titanfall 2 were collected and analyzed to find network attributes from the three gaming phases: (1) Fore-play (SNIs), (2) Session Initiation (packet payload length and byte patterns), and (3) Gameplay (packet rate profile).

The packet processing engine 226 processes the packet captures of multiple gameplay sessions and returns the corresponding network attributes. For the fore-play stage, the packet processing engine 226 extracts a list of SNIs from each packet trace and determines which are common to all of the packet traces as the SNIs of services that are always contacted prior to game-play in every session. In the case of Titanfall2, the services api.origin.com, river.data.ea.com and r2-pc.stryder.respawn.com are contacted in all sessions. To analyse the next two stages, the packet processing engine 226 isolates the gameplay flow in the packet capture ("pcap") using a simple heuristic: select the flow that transferred the most packets, having ensured that, during the collection of packet traces, the game being played is the most active application. After isolating the gameplay flow in the packet trace, the packet processing engine 226 then systematically extracts attributes for session initiation by considering the first n (a configurable parameter) packets of the flow. For every packet, the extracted attributes are: direction, payload length, and payload byte indexes and values. For example, if the first packet is upstream and has a 10 byte payload, then the attributes extracted are 10 (length of payload), and 10 numbers (in the range 0-255) corresponding to the byte values in the payload. These attributes are then compared against the packet traces from all of the training sessions to determine the attributes that do not change across sessions. In the case of Titanfall 2, the lengths of the first two upstream packets are always 49 bytes, and the length of the first two downstream packets is always 57 bytes. The byte values of the payloads however vary across sessions, and thus do not form the part of game signature for Titanfall 2 (in the session initiation stage). For the gameplay stage, the mean and standard deviation of the packet rates of gameplay flows were determined, and the downstream packet rates are very constant at 20 pps and the upstream rates are around 60 pps. With the characteristic attributes determined, they are added to the model. The resulting list of attributes for each game are shown in Table 2 below.

Of the SNIs contacted by Titanfall 2, "r2-pc.stryder.respawn.com" is particularly unique to the game, whereas the other SNIs are common to games by the same distributor (i.e., origin/ea). In the dataset of 30 games, 25 of them have a unique SNI that can indicates that a particular game is about to be launched. The other 5 games have common SNIs for each developer/distributor. For example, CS:GO and DoTA2 have the common SNI "api.steampowered.com", whereas Hearthstone and StarCraft II contact the service with SNI "battlenet.com". In the latter case, the games with a common distributor/developer are distinguished using session initiation attributes, as described below.

With the context determined from SNI (one/more possible games that can be played), session initiation attributes are used to isolate the gameplay flow corresponding to a specific game. Although session initiation attributes for the new game have been determined, it is not yet known how distinctive those attributes are relative to the attributes of the games in the model. Indeed, the session initiation attributes of Titanfall 2 (payload lengths of first 4 packets) exactly match the attributes and values of Apex Legends. And the session initiation attributes of the first two packets of CS:GO and DoTA2 are the same until the 3rd packet where they differ in 2 byte-values. To capture this variability and deterministically identify games, the apparatus and process described of this embodiment use a data structure that forms the core of the model: a two-level hash table. The first level of the hash table indexes using the attribute name (as a string), (e.g., "up_payload_len_0" indicating the attribute that measures the length of payload of the first upstream packet). The second level of the hash table indexes the value of the attribute (e.g., 49). Thus, the composite key for the hash table ("up_payload_len_0", 49) would return an entry which is a set of games that match both the attribute name and its value. In the example above, the model (before adding Titanfall 2) would have the set Apex Legends for the composite key mentioned above. Similarly, other games would be in the set corresponding to their attributes that form the game signature.

For example, League of legends would be in the sets indexed by the composite keys ("up_payload_len_0", 515), ("down_payload_len_0", 107), ("up_payload_len_1", 515), ("down_payload_len_1", 107), and so on.

Given a new game signature consisting of a list of attribute keys and their respective values (forming respective composite keys), adding the game to the model is as simple as adding the game (i.e., an identifier of the game) to the set of possible games for each composite key. If the attribute does not already exist in the model (i.e., it was not already being used to identify any other game known to the model), then a new attribute name is added as a key in the first level of the hash table, and a new key for the value of that attribute is added to the second level, and the corresponding set would consist of only the new game. If both the keys clash, as in the case of Titanfall 2, then the new game is added to the set of possible games for the composite key. Thus the addition of Titanfall 2 as the new game in the described example would provide an updated model that consists of the set "Apex Legends", "Titanfall 2" for the composite keys ("up_payload_len_0", 49), ("down_payload_len_0", 57), ("up_payload_len_1", 49), and ("down_payload_len_1", 57).

After the addition of the new game, the model is used as follows. When a user opens the Titanfall 2 client, the unique SNI corresponding to Titanfall 2 is found. Using that, the list of possible games is instantiated as Titanfall 2. The subsequent UDP flows are checked against the union of attributes of the possible matching games. In this example, the payload length of the first upstream packet will be checked and found to be 49. For a true gameplay flow, after checking the attribute(s), the model returns the set of possible games (matching the session initiation attributes) as "Apex Legends" and "Titanfall 2". However, since the SNI(s) indicated that the only possible game is Titanfall 2, the model determines the intersection of that initial set of possible games with the set of games matching the session initiation attributes. Since the intersection results in a single game, Titanfall 2, the model declares the flow as classified. In the case of a flow that is not a gaming flow, there are two possibilities: (a) the first packet payload is not 49-bytes long—the model eliminates these flows because the matching set of games using session initiation attributes is an empty set, and (b) the payload is actually 49-byte (i.e., a false positive case)—in this scenario the model can be configured to declare the flow as a Titanfall 2 flow only after looking for at least k out of n attributes. In spite of that, if k attributes match, it is a mis-classification. In an evaluation of packet traces collected from campus traffic, described below, the inventors found only 2/1000 such false positive cases. Further, although the model has classified the flow, it can still monitor the packet rates and perform additional checks on the classification if desired. Doing so resulted in 100% accurate classification of games on the campus traces.

In work leading up to the invention, the inventors faced some challenges while developing the model described herein. In particular, the games CS:GO and DoTA2 take a large number of packets (>10) to be detected. When investigated, these games were found to exhibit peculiar behaviour. Firstly, it is important to note that both games were developed by Valve, and thus exhibit similar characteristics. When the game client is first launched, it starts to continuously ping multiple servers on which a match can be hosted. These ping packets are proprietary UDP packets that go back and forth between the server and client. When the gamer clicks play, one of the servers is selected (presumably the one with lowest average ping time), and the session initiation occurs, followed by the gameplay. However, it was found that the same five tuple flow is used to ping and carry the gameplay traffic. Thus, even though the session initiation differed between these games, the first ping packets were of the same structure and thus the games were indistinguishable using them. However, when the ping packets are excluded, the model is able to distinguish these games using the byte patterns of the 3rd packet. A similar behaviour is observed in the case of co-operative games that use STUN protocol to traverse NAT (e.g., Monster Hunter World, Payday 2 and Borderlands 3). The attributes of the first few packets of these games (corresponding to the STUN negotiation) were included in the model, and consequently all the games using STUN were present in the sets matching those attributes. Only after the STUN negotiation is complete do patterns emerge that can distinguish amongst these games. In spite of the fact that it takes longer for these games to be identified, the model nevertheless detects the flow carrying gameplay prior to the start of the match, thereby providing enough time to take a reactive action such as prioritization to protect the user experience of these games.

Estimating User Experience

The key experience metric for an online gaming user is latency (also referred to as "lag") that represents the time it takes for a user's (and other players') actions to be reflected in the updates sent by the game server. The latency has two components—a baseline component which includes the propagation/processing delays along the network path to the gaming servers, and a variable component (referred to as 'jitter') which arises due to dynamic queueing delays in the network due to congestion and contention. The degree to which these metrics affect a gamer's experience depends on factors such as the type of game, mode of gameplay, or even how long the user is in the match (where the game gets serious towards the end).

Estimating the baseline latency from packet traces turns out to be a non-trivial task for many games, since they neither use explicit ICMP Ping packets, nor is their request-reply sequence number pattern readable due to masking/encryption (some games like Fortnite, CS:GO, and DoTA2 have proprietary pinging formats that can be read at the beginning of the session, but this approach cannot be generalized). The games themselves compute ping latency using the game-play packets, which the games report on their user interface.

The following discussion focuses on the variable component of the latency, since it captures the extent to which game-play is affected by network conditions, noting that game servers send updates to the client at a fixed packet rate (often referred to as the "tick rate"). As described above, DotA2, FIFA, and CS:GO have fixed tick rates of 32, 30, and 64 pkt/sec. During congestion, which predominantly occurs in the downstream direction, the packet rates seen by the client can deviate significantly from the tick rates, resulting in latency spikes (aka "lag" that gamers complain about).

Figure 7:
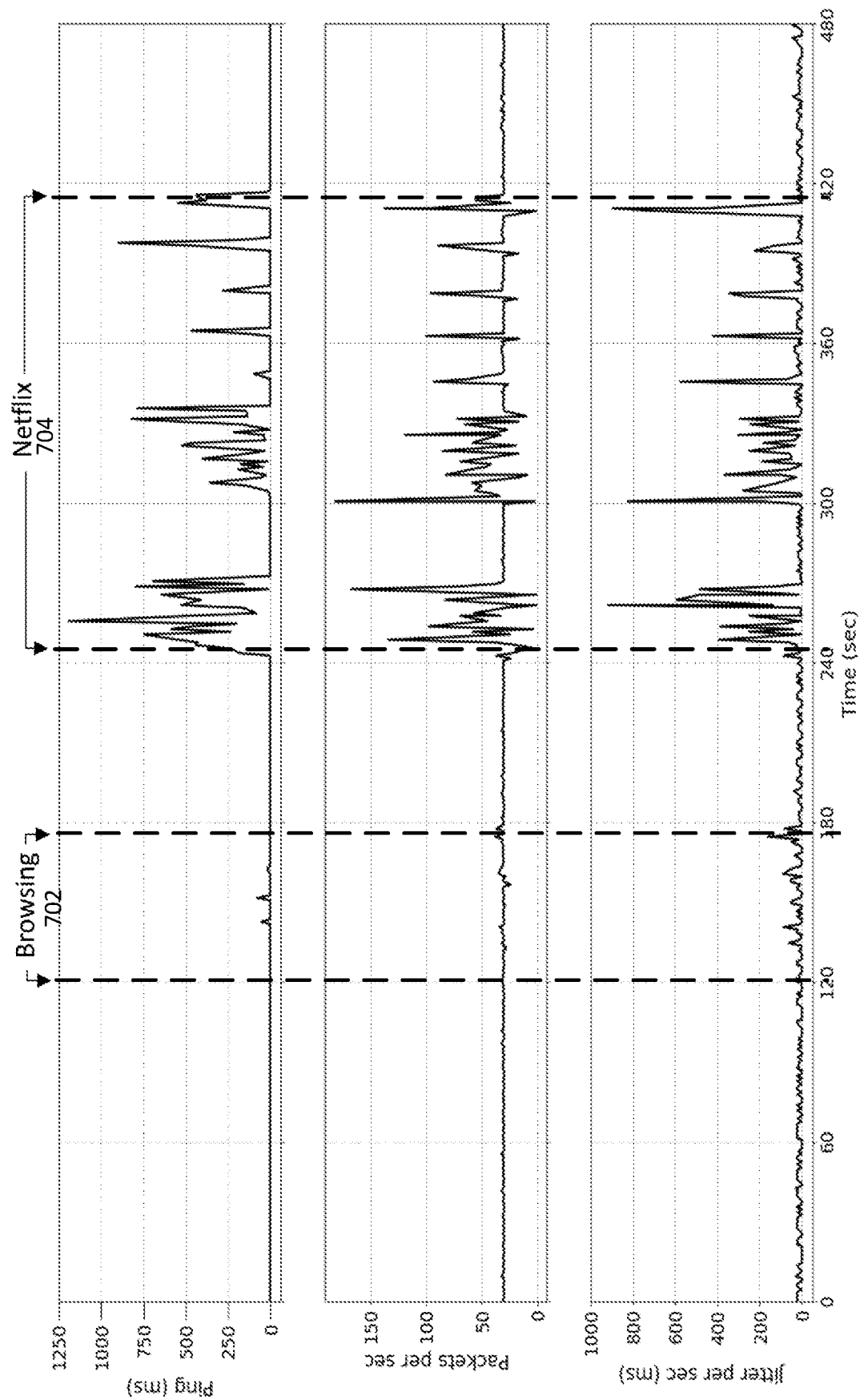
FIG. 7 includes graphs representative of user experience of online gaming as a function of time, specifically: (top) in-game ping, (middle) packet receive rate, and (bottom) jitter calculated by the process of FIG. 3.

To illustrate this, the upper two graphs in FIG. 7 show ping (in ms) and packet rate (packets per second) for an 8-minute (480 second) network packet trace of DotA2 played over a 10 Mbps link (representative of a typical residential broadband connection), while another machine in the home is browsing (during the $3^{rd}$ minute 702 between dashed lines) and then watching Netflix (during 5th to $7^{th}$ minute 704 between dashed lines). The ping reported by the game interface is shown in the top graph. The baseline ping is below 10 msec, and is smooth for the first two minutes when there is no background traffic, with a packet rate in the range 30-31 pkt/sec (middle plot) which is consistent with the tick rate. In the subsequent minute (120-180 s), the second machine was used to browse several websites, including Reddit, Youtube, Spotify and news.com, which caused the game ping to rise above 50 msec for a short period, and the corresponding packet rate in the middle graph of FIG. 7 shows corresponding fluctuations. At t=240 seconds, the Netflix webpage was opened on the second machine, which resulted in the game ping spiking to over 1 second as network traffic was generated by Netflix playing trailers of movies for 30 seconds. At time 300$s$, a movie started playing on Netflix, which resulted is a continuous spike in the time period t=300-340, which corresponds to the buffering phase of Netflix video wherein it continuously downloads the video to fill up its buffer. Subsequently, periodic spikes in ping values (of nearly 500 msec) were observed as Netflix downloads the media in chunks. The packet rate received by the game client also shows large fluctuations. When the Netflix video was stopped at time 420$s$, the game-play ping and packet rates returned to their normal values. This illustrates how sensitive game-play experience is to background traffic such as video streaming, with periodic spikes resulting in unacceptable experience to the gamer.

The apparatus and process described above were used to compute the "jitter" of gameplay streams based on network traffic. Ideally, if the update rate of a game is fixed and is known beforehand, ticks could be placed at a fixed time spacing determined by the rate, and jitter for each arriving packet could be calculated as the offset from its ideal tick position. As described above, in practice different games have different tick rates, and these can further vary during the game (as in Apex Legends), so the tick rate is instead estimated by measuring packet arrival rate over a large window $T_w$ of several seconds. The tick (i.e. ideal arrival time) for a packet is determined by equally spacing all packets that arrived over a window $T_w$. More formally, let n denote the number of packets arriving over the past $T_w$ seconds. Then, the ideal arrival time for the i-th packet (0≤i<n) within this window is $i*T_w/n$. If the actual arrival time of packet i is $t_i$, then the jitter for this packet is $t_i - i*T_w/n$. Averaging this across all packets over the last second in that window provides a measure of current jitter for the flow. The window size ($T_w$) over which ticks are generated is intentionally selected to be larger than the window size (1 second) over which average jitter is computed—this allows the tick-rate to fluctuate at a slower timescale while still keeping jitter computation current. In this example, the computation was repeated every second by sliding the windows forward by one second. This process can indicate the tick rates of a game, as well as measure the jitter that estimates the variable component of the game latency.

Applying the process to the packet trace in the example described above provides the lower graph in FIG. 7, showing the calculated jitter as a function of time during game play. It shows fairly smooth and jitter-free performance when gaming is the sole traffic in the network (0-120 seconds and 420-480 seconds). The browsing sessions in the interval 120-180 seconds 702 show up as minor spikes in jitter of around 50 msec, while the jitter during the Netflix streams 704 calculates to several hundreds of msec; equally importantly, the computed jitter spikes align well with the ping spikes reported by the game interface. Keeping in mind that the game interface is visible only to the game player, the jitter values calculated by the apparatus and process described herein gives the network operator visibility into the stability of experience for each gaming stream in their network.

Using the behaviour of online games described above, the apparatus was used to detect game-play flows in real-time in a University campus network that serves thousands of students, staff, and college residents. The inventors installed an optical tap on the University's 10 Gbps Internet link, and raw packets from the optical tap were received by the switch 112 and apparatus 200. Note that these packets did not include the University's traffic to/from its off-site private cloud or its cloud (AWS) connectivity, and therefore gameplay flows to these clouds was not captured.

TABLE 3

| CS:GO signature attributes | |
|---|---|
| Attribute | Match values |
| Indicator SNI | api.steampowered.com |
| Server-side UDP Port | 27000-27100 |
| Upstream packet rate | 64 pkt/sec |
| Downstream packet rate | 64 pkt/sec |
| Duration | >10 sec |

The typical lifetime of a gaming flow through the apparatus 200 is as follows: First, the game client 102 initiates a TLS connection to its lobby/match-making servers. This TLS exchange is captured by the apparatus 200 and the Server Name Indication (SNI) is extracted from the initial packets of the flow. This is then matched against the list of known SNIs for the various games (as shown for Fortnite in Table 2 above) and it is noted as an indicator that the client is likely to initiate a UDP gaming session for the particular game. Subsequently, the apparatus 200 monitors UDP flows (gaming candidates) to/from these identified clients to detect live game-play sessions. To do this, the apparatus 200 collects several attributes from candidate flows and matches them against a set of signatures to identify the game-play flow—for games that are from the same developer/distributor, server side UDP port ranges, upstream to downstream packet ratios, tick rates, and duration are used to disambiguate the various games, as shown for CS:GO as an example in Table 3. Taken together with the SNIs, these let the apparatus 200 isolate game-play flows and identify games with high confidence. To validate the attribute-based detection, detailed analysis of game-play pcaps has been conducted to produce specific byte patterns that are characteristic of the games in Table 1.

University border traffic on the 10 Gbps bi-directional Internet link was fed via the optical taps to the apparatus 200 for a period of one week in June 2019. The apparatus 200 detected, identified, and logged gaming traffic in real-time, and did not store any packet traces. The correctness of game identification was validated by initiating known games from lab machines on campus and verifying their detection and identification—all the ones in Table 1 were detected and identified successfully.

Figure 8:
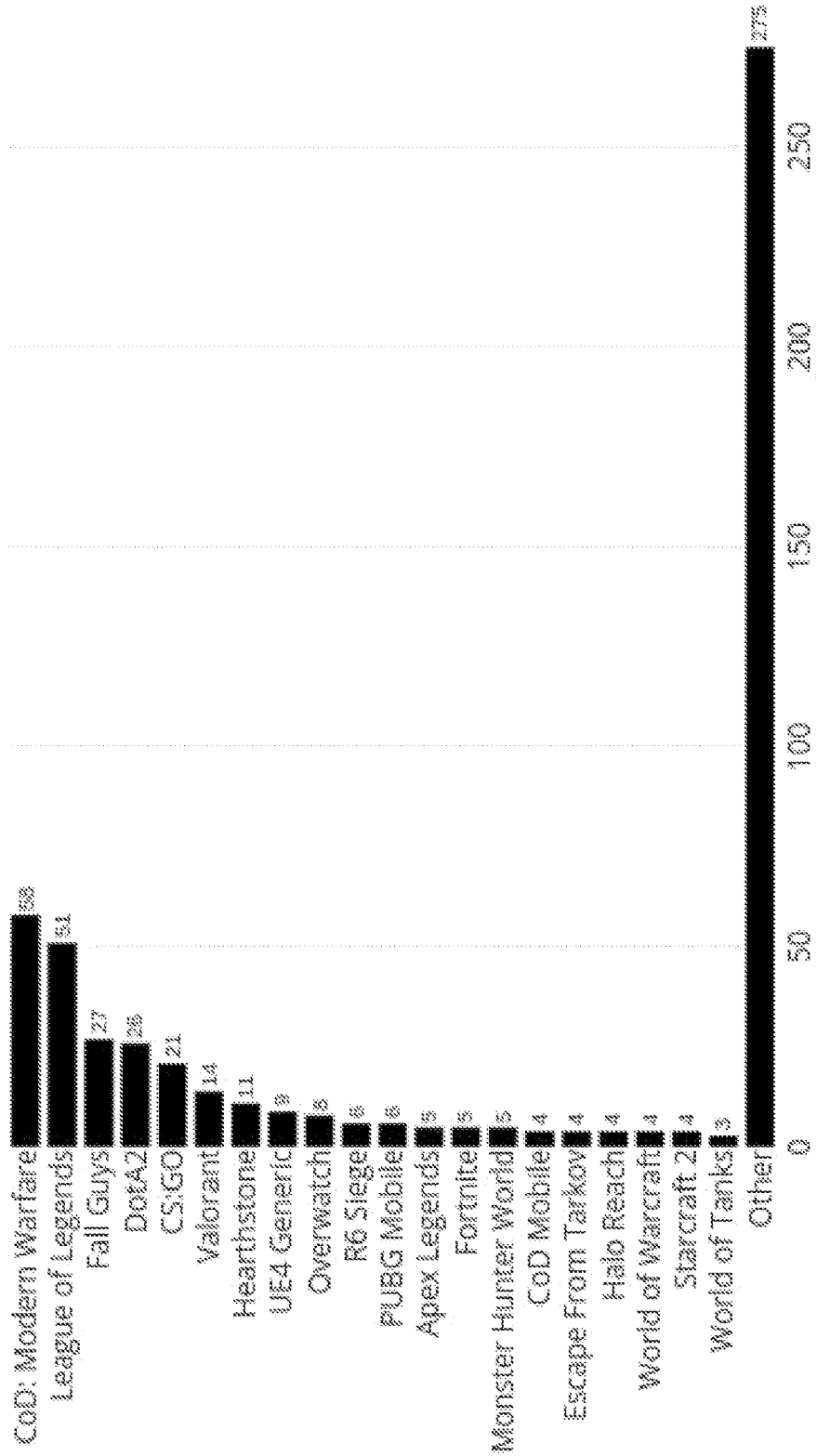
FIG. 8 is a time series chart showing game play network flows over one day as measured in a testbed network.
Figure 9:
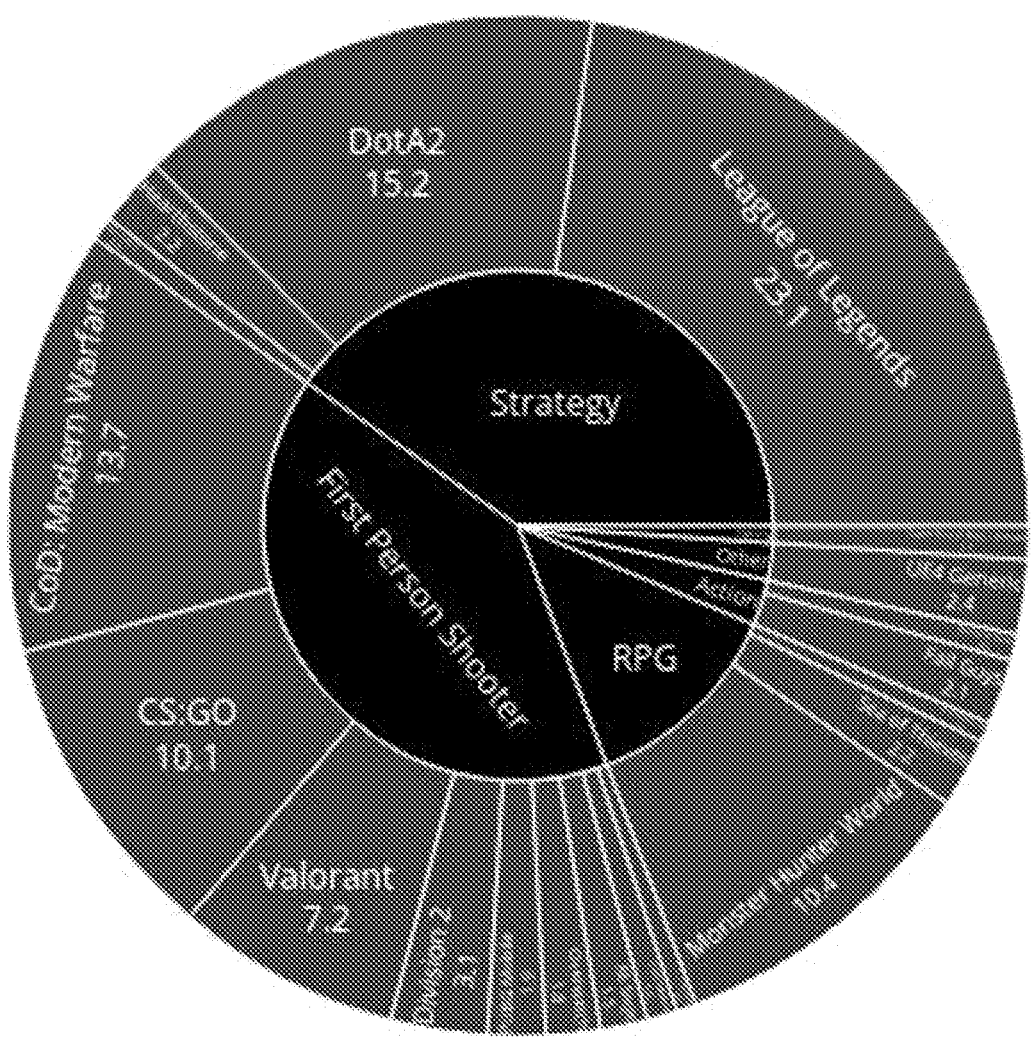
FIG. 9 is a pie chart showing game play flows over a duration of one week as measured in the testbed network.

Analysis of gaming logs over a month yielded some interesting insights. FIG. 8 illustrates the hourly number of gaming users on a typical week-day (x axis). The most popular games seem to be CoD: Modern Warfare and League of Legends; the latter is considered a classic (released in 2009), whereas the former is a new trending game (only released in November 2019). The pie chart of gameplay session duration shown in FIG. 9 reveals that the gamers spend most of their time playing Shooting and Strategy games. Further, while fewer players play league of legends and DoTA2, they seem to be playing for longer. Despite Fortnite being a very popular game, the data captures only a few sessions—as stated above, this is probably because most of the Fortnite flows go over the University's AWS link for which the apparatus 200 does not have a traffic feed.

The ability of the apparatus 200 and process 300 to detect and identify over 10,000 game-play flows in real-time on a campus network makes it a valuable tool for ISPs to measure the extent and variety of gaming on their networks. When coupled with the gaming experience measurement method described above, it can give them invaluable insights into the readiness of their network for the onslaught of online gaming.

In an alternative embodiment, the apparatus and process generate estimates of latency and jitter by passively monitoring the network flows using different methodologies for games that are TCP-based, tick-based or request-response based, respectively.

To facilitate understanding these methodologies, it is important to understand a few game-related concepts and jargons. Most modern online games adopt one of the following networking models: (a) dedicated server, (b) client-hosted and (c) PvP. In a dedicated server model (commonly adopted by FPS/TPS/Battle Royale shooting games), a server (owned by the game developer/distributor) receives inputs from all the game clients, performs a simulation of the game world, and sends the resulting output back to all the game clients. This model, although has monetary costs for the developer, is preferred by competitive games connecting multiple players due to its simplicity (no need of NAT traversal), security (authoritative server), and fairness (no single user has an unfair advantage). In a client-hosted model (usually adopted to avoid the costs of running dedicated servers), one user's game client (usually the one with the best network connectivity) also acts as a server to which other users can connect. Although this model saves infrastructure costs, it needs to perform NAT traversal using a protocol like STUN, and also provides unfair advantage to the gamer hosting the match as they have 0 latency. Finally, in a PvP model (common in co-operative game modes), each player connects to every other player during a session wherein usually the players perform a mission together or explore open worlds within games (e.g., Borderlands 3, Warframe). This network model is rarely used for competitive game modes due to the overheads involved, but is a natural fit in hop-on-hop-off and exploratory co-operative game modes.

Almost all online shooting games and most competitive multiplayer games have their servers running simulations at a 'tick rate' wherein each server takes in all the input received within a time period (of the order of milliseconds) referred to as a 'tick', performs a simulation, and sends back the resulting data to the client. For example, most of the servers of the game CS:GO run at a tick rate of 64 hz, with some competitive servers offering a tick rate of 128 hz. A 64 hz tick rate indicates that the server processes the player inputs and sends back the response within 16 ms. Games like Fortnite, Apex Legends, PUBG or the ground war mode in CoD: Modern Warfare have lower tickrates of around 30 hz because they handle the inputs of 100 players at once in a match. In all these games, the downstream packet rates directly correlate with the tick rates of the server; e.g., CS:GO has a packet rate of 64 pkts/sec. This fact is exploited to infer the experience for tick-based games as described below.

Figure 14:
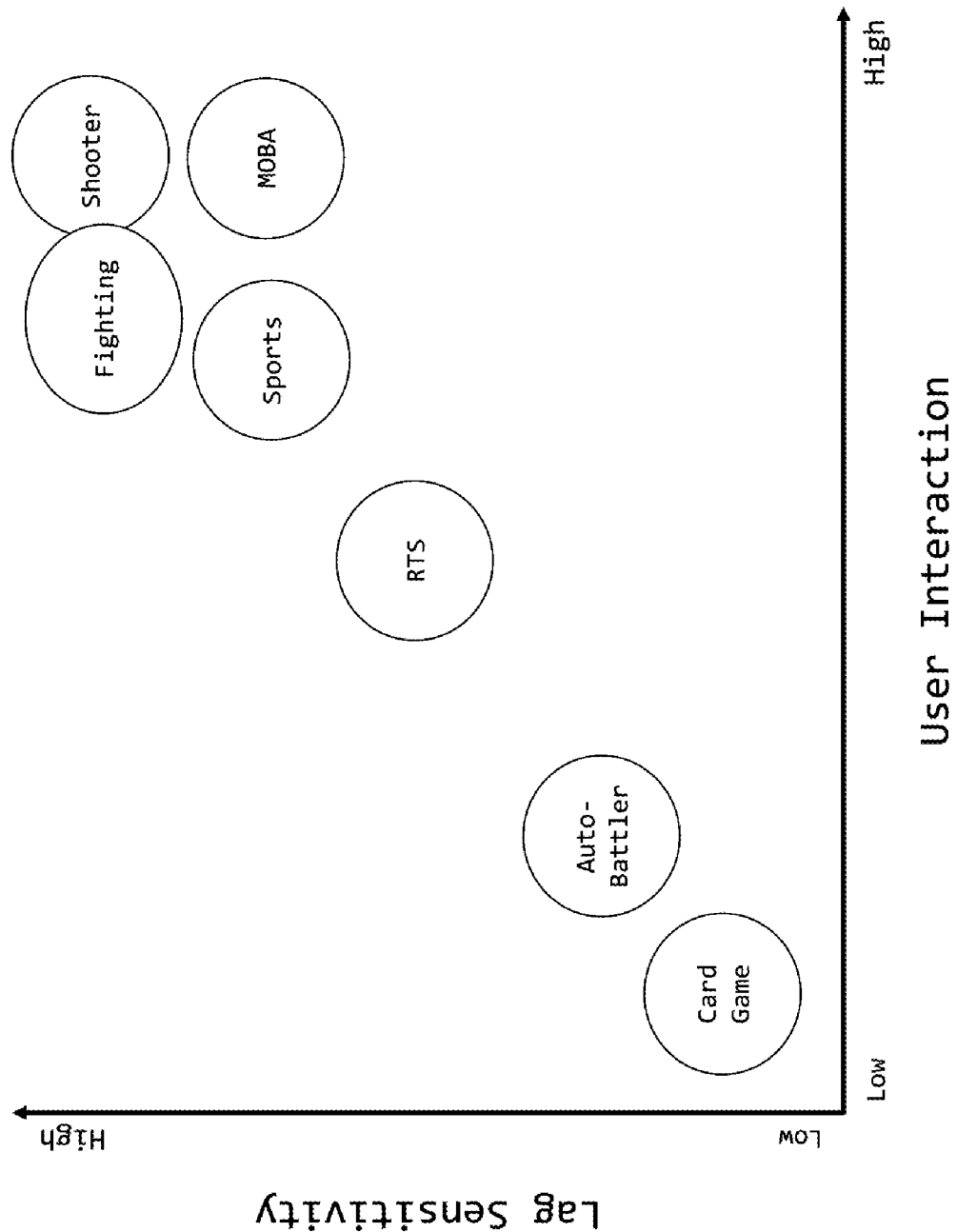
FIG. 14 is a schematic illustration of the different lag sensitivities of different game genres.

An online multiplayer game is fundamentally affected by network latency. The effect, however, can be differently perceived, depending on the game being played. To understand this relationship, the inventors performed controlled experiments in their lab by inviting gamers from a gaming club at the inventors' university. The gamers played multiple games across different genres on a gaming PC, and reported their experience of playback for each session. The inventors introduced a machine running Ubuntu between the gaming PC and the wall port connected to the university network (offering Internet services). The network conditions as perceived by the gaming PC were synthetically altered using the tc (traffic control) tool in the Ubuntu machine. Artificial latencies were introduced and two values of latency were determined for each game: a good latency (below which the player could notice no difference), and a bad latency (above which the gamer was frustrated with the experience). The average values reported across multiple gaming sessions are listed in Table 3 below, and the lag sensitivities of various game genres are illustrated in FIG. 14. It is apparent that, although latency does affect the gameplay, it is dependent upon the specific game being played. This highlights the need to be able to automatically identify specific games being played at any given time, and also to measure the corresponding network latencies, and map them to bands of user experience.

In some embodiments, the apparatus measures network latency using different methods depending upon whether the network flows of the gameplay are constituted by TCP packets or UDP packets.

TCP is an ACK based protocol; i.e., the data sent from one endpoint to another receives an acknowledgment (an "ACK") of the data. Thus, the sequence and ack numbers in the TCP header are used to estimate the RU (round trip time) of every segment being transferred. In the described embodiments, two queue data structures are used (one for each direction), and the end-to-end RU is estimated by monitoring the packets of a flow at a network location in the middle.

TABLE 3

Games, Genres, Latency Thresholds and Type

| Game | Genre | Green Latency | Red Latency | Tick Rate |
|---|---|---|---|---|
| Fortnite | TPS | 100 ms | 170 ms | 30 hz |
| Modern Warfare | FPS | 100 ms | 200 ms | 60/20 hz |
| Battlefield 5 | FPS | 150 ms | 200 ms | 60/30/20 hz |

TABLE 3-continued

Games, Genres, Latency Thresholds and Type

| Game | Genre | Green Latency | Red Latency | Tick Rate |
| --- | --- | --- | --- | --- |
| CSGO | FPS | 100 ms | 150 ms | 64 hz |
| Mortal Kombat 11 | Fighting | 120 ms | 200 ms | 64 hz |
| Tekken 7 | Fighting | 120 ms | 200 ms | 64 hz |
| League of Legends | MOBA | 150 ms | 300 ms | NA |
| DotA 2 | MOBA | 150 ms | 300 ms | 30 hz |
| Fifa 20 | Sport | 250 ms | 350 ms | 30 hz |
| Madden NFL 20 | Sport | 250 ms | 400 ms | 60/30/20 hz |
| Age of Empires II | RTS | 200 ms | 450 ms | NA |
| Starcraft 2 | RTS | 200 ms | 350 ms | NA |
| Monster Hunter World | ARPG | 300 ms | 500 ms | NA |
| World of Warcraft | MMORPG | 300 ms | 500 ms | NA |
| Dota Underlords | Auto battler | 200 ms | 500 ms | NA |
| TFT | Auto battler | 200 ms | 500 ms | NA |

Figure 15:
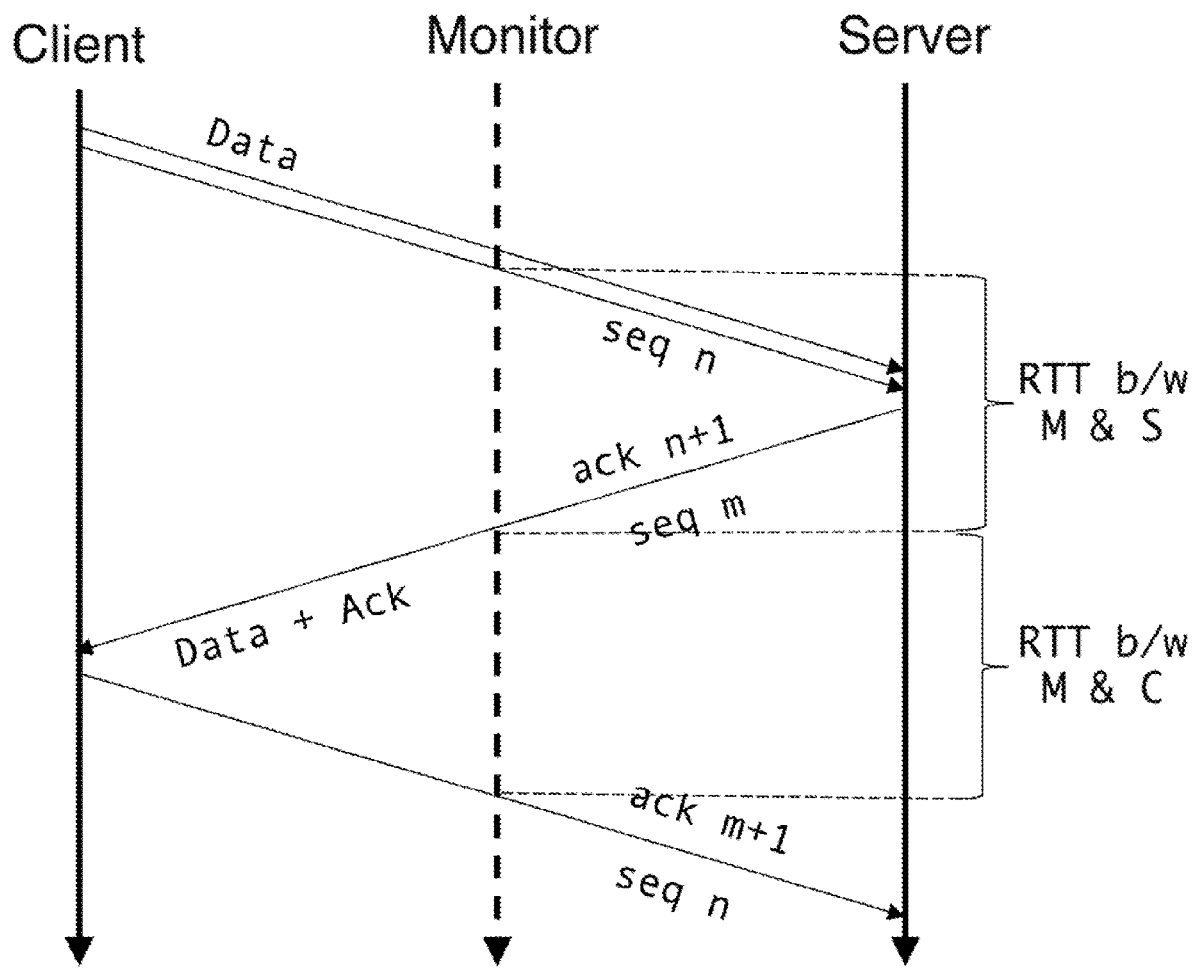
FIG. 15 is a schematic diagram illustrating the use of round-trip times of a TCP packet between the monitoring location and a gaming client, and between the monitoring location and a gaming server to calculate an overall measure of network latency for the TCP gaming packet.

The apparatus and process measure network latency as follows, in the context of an example and with reference to FIG. 15. A (game) client sends/receives data to/from the (game) server while the apparatus monitors packets at a network location between the client and the server. FIG. 15 illustrates a point in time when the client is sending some data using two packets (say 1 byte each) back-to-back. It may do so if the TCP congestion window ("CWND") is sufficiently high. When the apparatus receives a packet, it enqueues a two tuple with a current timestamp and a value (=seq num.+data len) into the queue. In this case, the queue contains a couple of two tuples with the latest one corresponding to seq n (+1). The server chooses to acknowledge both packets together, sending a data packet with its ACK number set to n+1. The apparatus dequeues the two tuples until it finds one whose value is equal to the ack number (which is packet two). It then computes the RU between the monitoring point and server by subtracting the current timestamp of the ack from the timestamp in the enqueued two-tuple. The server also sends data along with ack (n+1) with a sequence number m. The apparatus uses another queue to store two-tuples in this direction and estimates the RU between monitor and client in a corresponding way. The apparatus then sums the two RTT values to determine the RU between the gaming client and the gaming server for the TCP-based game.

In case of packet losses and retransmissions, a two-tuple with the same sequence may be enqueued twice (i.e., when a loss occurs at a network location after the monitoring location). To account for such cases, the apparatus dequeues the packets until the packet at the head of the queue has a greater sequence number than the ack number in the other direction.

Unlike TCP, UDP does not use sequence numbers or ACKing mechanisms. Further, most UDP-based games are asymmetric: their upload stream is independent of their download stream. UDP download streams, however, in many cases come in at a flat tick rate matching the corresponding game server. Any network congestion, however transient, causes high jitter in the tick stream. The apparatus measures poor experiences caused due to these situations by computing the cell delay variation.

For UDP games with a constant tick-rate (e.g., CS:GO, DoTA2, R6 Siege), the cell delay variation is estimated as follows. Consider the downstream direction of a gameplay flow. Since the tick rate is constant, the inter-packet time is constant. Accordingly, the poor experience (in terms of jitter) is estimated by computing the standard deviation of inter-packet arrival times of all packets within a period of one second. Thus the apparatus estimated the cell delay variation every second, and the higher it is the more the user experience of the game could be impacted.

Some games, for example League of Legends, have a request-response type behaviour, where every upstream packet from a client causes a corresponding downstream packet to be sent from the server. By tracking the timestamp and direction (in a queue) of every packet since the beginning of a game, the apparatus estimates the latency partially; i.e. from the monitor to the server and back. Since, in the described embodiment, the measurement point is closer to the client and after the ISP's rate limiters are applied to the traffic, this value is a good estimate of the impact of cross-traffic on user's game QoE.

In an alternative embodiment, the apparatus and process estimate network latency using a queueing model. Consider a rate limited queue serving one subscriber. Hypothetically, if a bit is inserted into the queue exactly at the tick rate, then the exact delay caused due to the queue bottleneck can be estimated as the queuing delay (the time at which the bit would leave the queue).

Figure 16:
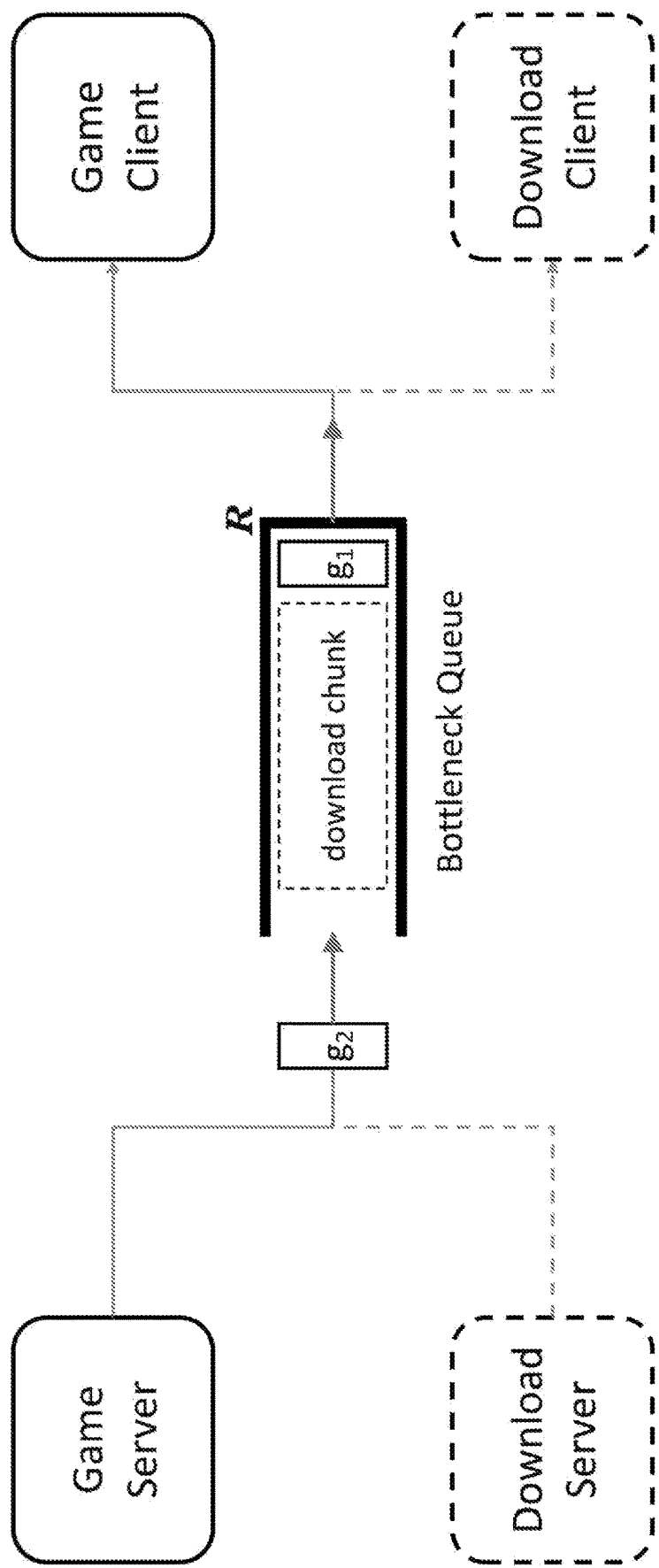
FIG. 16 is a schematic diagram illustrating queueing delays caused by a gaming user downloading a file simultaneously with gameplay.

FIG. 16 shows an example scenario in which a subscriber has two active clients transferring data over the network: a gaming client and a download client. The packets corresponding to these applications pass through a bottleneck queue which is capped at a maximum throughput rate of R bits per second. The worst-case impact on the latency of the gaming application due to the download chunk competing for the user's limited bandwidth is estimated as follows. The system is in a state wherein a gaming packet $g_1$ is about to be delivered out of the queue. Before $g_2$ is enqueued, a chunk of data is downloaded from the server. This data will be dequeued at the maximum drain rate R. If it is dequeued before the next gaming packet $g_2$ arrives, then the gaming application won't be impacted at all. Conversely, if it takes a longer time, then the packet $g_2$ will experience a delay (i.e., an increase in latency) due to the packets of the download chunk waiting to be dequeued.

This additional latency of the gaming packet $g_2$ is equal to the time it takes for the download chunk packets (that are present when $g_2$ arrived) to be dequeued. In other words, it is the time period over which the download rate of traffic of the user is at its capped maximum value. Thus, by monitoring the departure process of the queue, in particular the output rate of the queue, the additional delay to a gaming packet can be estimated as the time for which the output rate is equal to the bottleneck maximum rate R. Now, if in that time k gaming packets were enqueued, then the delays experienced by each can be computed in a similar fashion. Computing the standard deviation of those measurements provides an estimate of jitter.

Figure 17:
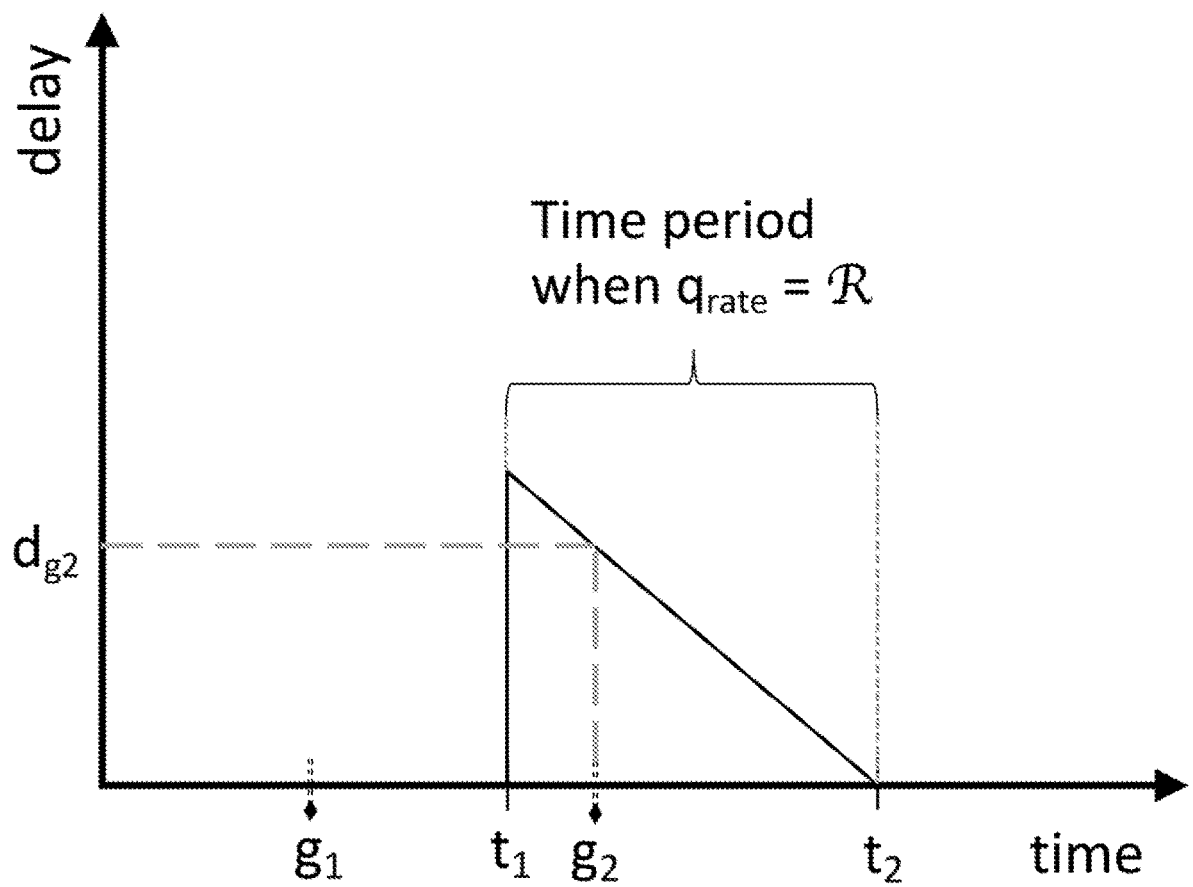
FIG. 17 is a graph illustrating the calculation of queueing delays for the scenario of FIG. 16.

In the graph shown in FIG. 17, the y-axis shows the worst-case queueing delay experienced by a packet that arrives at time t (on the x axis). Continuing with the example described above, consider that the output rate of the queue was at the maximum-rate R between $t_1$ and $t_2$. Because $g_1$ arrived before $t_1$, it did not have any queueing delay. The packet $g_2$ however, came after $t_1$ (and by then the chunk was dequeueing at the maximum rate). The chunk will finish dequeueing at $t_2$, which means that the queueing delay experienced by $g_2$ will be the period between $t_2$ and the arrival time of $g_2$. This can be computed more generally using a line with slope −1 for the time period when the queueing rate is R. Thus in this embodiment the apparatus and process can estimate the additional delay experienced by any packet $g_k$ that comes along with competing 'cross-traffic' that creates congestion in the queue. If only the output process of a queue can be measured, then knowledge of when the packet entered the queue is not available. In such cases, the worst-case delay can be estimated as $t_2-t_1$.

Thus, the simple queue model described above, the apparatus and process can estimate the worst-case delay and jitter experienced by a game due to cross traffic. This technique can be applied to monitor the QoE for variable tickrate UDP games.

As described above, the apparatuses and processes described herein have been applied to detect online gaming sessions, to identify the specific online games being played in each session, and to provide quantitative estimates of the jitter of the gaming sessions as a measure of use a quality of experience. When applied to a university campus testbed, the described apparatus and process are able to correctly identify games correctly with 98% accuracy before gameplay begins, rising to 99.8% within the first few seconds of game commencement.

For TCP-based games, the described apparatus and process are able to directly measure end-to-end latency by tracking sequence numbers on data and acknowledgement packets. For UDP tick-base games, it suffices to estimate the latency jitter (derived from inter-packet spacing) and map these to qualitative experience measures. Because an ISP will only be able to measure traffic upstream of the aggregation point in the access network, a simple queueing model is used to compute the latency jitter based of aggregate traffic arrival patterns sampled at a high rate.

Many modifications will be apparent to those skilled in the art without departing from the scope of the present invention.

The invention claimed is:

1. A computer-implemented process for estimating user experience of online gaming, including the step of monitoring the flow of network packets of an online game at a monitoring location between a client gaming device and a game server to generate quantitative estimates of jitter in the flow of network packets of the online game as a measure of user experience of the online game, wherein the step of monitoring includes, if the online game is a UDP-based fixed tick rate online game, the steps of:
(i) counting network packets of the online game over a first time period of a first length to determine a network packet count;
(ii) for each network packet of a subset of the counted network packets over a second time period within the first time period, measuring a corresponding arrival time for the network packet at the monitoring location;
(iii) determining an average time between the counted network packets by dividing the first length of the first time period by the network packet count;
(iv) for each of the network packets of the subset of the counted network packets, determining a corresponding ideal arrival time for the network packet from the average time between the counted network packets and the start or finish of the first time period;
(v) for each network packet of the subset of the counted packets, determining a corresponding deviation of the measured arrival time of the network packet from the ideal arrival time of the network packet;
(vi) averaging the deviations for the subset of the counted packets to determine a corresponding jitter value for the second time period; and
(vii) sliding the first time period forward by a predetermined amount; and
(viii) repeating steps (i) to (vii) to determine successive jitter values for respective times.

2. The computer-implemented process of claim 1, wherein the step of monitoring includes repeatedly generating the quantitative estimates of jitter in the flow of network packets to provide a continuous measure of user experience of the online game.

3. The computer-implemented process of claim 2, including displaying the quantitative estimates in real-time.

4. The computer-implemented process of claim 1, wherein the step of monitoring includes generating quantitative estimates of latency.

5. The computer-implemented process of claim 1, wherein the monitoring location is within an Internet Service Provider (ISP) or other access network.

6. The computer-implemented process of claim 1, wherein steps (i) to (vii) are repeated in real-time so that the jitter values are representative of real-time user experience of the online game.

7. The computer-implemented process of claim 1, wherein the predetermined amount is a duration of the second time period.

8. The computer-implemented process of claim 7, wherein the length of the second time period is of the order of 1 second, and is preferably approximately 1 second, and the first length of the first time period is approximately several seconds.

9. The computer-implemented process of claim 1, wherein the step of monitoring includes determining a standard deviation of inter-packet arrival times of a tick-based UDP game as the measure of jitter.

10. The computer-implemented process of claim 1, wherein the step of monitoring includes monitoring timestamps and flow directions of UDP packets of a request-response based game to determine network latencies of the UDP packets.

11. The computer-implemented process of claim 1, wherein the step of monitoring includes monitoring download queuing periods of game packets to estimate corresponding queuing delays of the game packets due to limited download bandwidth of a gaming user, and determining a standard deviation of the queuing delays as the quantitative estimates of jitter.

12. The computer-implemented process of claim 1, wherein the step of monitoring includes measuring a latency of each of a plurality of TCP packets of an online game by using sequence and acknowledgement numbers to measure a corresponding downstream round-trip time between the monitoring location and the client gaming device and a corresponding upstream round-trip time between the monitoring location and the game server, and summing each upstream round-trip time for a TCP packet and the corresponding downstream round-trip time for the TCP packet to provide a corresponding round-trip time for the TCP packet between the client gaming device and the game server as an estimate of latency of the TCP packet.

13. The computer-implemented process of claim 1, including detecting online gaming sessions by matching attributes of network flows to predetermined attributes of network flows of known games so that said step of monitoring only monitors network packets of online games.

14. The computer-implemented process of claim 13, wherein the predetermined attributes of each known game network flow includes:
   (i) a Server Name Indication (SNI) of a corresponding TLS connection; and
   (ii) a corresponding pre-determined byte pattern of the known game network flow.

15. The computer-implemented process of claim 14, wherein the predetermined attributes of each known game network flow further include at least one of:
   (iii) a duration of a corresponding network flow;
   (iv) an upstream packet rate of the corresponding network flow; and
   (v) a downstream packet rate of the corresponding network flow.

16. The computer-implemented process of claim 13, including updating a forwarding table of a network switch to cause the network switch to selectively forward packets of a corresponding online game session for said monitoring.

17. An apparatus for estimating user experience of online gaming, including at least one processor configured to execute the process of claim 1.

18. A non-transitory computer-readable medium having stored thereon processor-executable instructions that, when executed by at least one processor, cause the at least one processor to execute the process of claim 1.

19. A computer-implemented process for detecting online gaming sessions, including the steps of:
   (i) monitoring network packet flows at a monitoring location between one or more client gaming devices and one or more game servers;
   (ii) determining attributes of the monitored network packet flows; and
   (iii) detecting online gaming sessions by comparing the determined attributes of the monitored network packet flows with corresponding predetermined network packet flow attributes.

20. The computer-implemented process of claim 19, wherein the predetermined network packet flow attributes include:
   (i) at least one Server Name Indication (SNI) of a TLS connection of a corresponding TCP flow; and
   (ii) a corresponding pre-determined byte pattern of the known game network flow.

21. The computer-implemented process of claim 20, wherein the predetermined attributes of each known game network flow further include at least one of:
   (i) a duration of a corresponding network flow;
   (ii) an upstream packet rate of the corresponding network flow; and
   (iii) a downstream packet rate of the corresponding network flow.

22. The computer-implemented process of claim 20, wherein the predetermined attributes further include a server-side port number.

23. The computer-implemented process of claim 19, including updating a forwarding table of a network switch to cause the network switch to selectively forward packets of a corresponding online game session for said monitoring.

24. The computer-implemented process of claim 19, wherein the determined attributes of the monitored network packet flows are compared with corresponding predetermined network packet flow attributes using lookups of a two-level hash table for composite keys, wherein each composite key includes an identifier of a corresponding attribute and a corresponding value of the attribute, the identifier of the attribute providing a key for a first level of the two-level hash table, the value of the attribute providing a key for a second level of the two-level hash table, wherein a lookup of the two-level hash table for a composite key provides a list of one or more games matching the composite key.

25. An apparatus for estimating user experience of online gaming, including:
   a memory;
   at least one processor; and
   an experience estimation component configured to monitor the flow of network packets of an online game at a monitoring location between a client gaming device and a game server to generate estimates of at least one of latency and jitter in the flow of network packets of the online game as a measure of user experience of the online game, wherein monitoring includes, if the online game is a UDP-based fixed tick rate online game:
      (ii) counting network packets of the online game over a first time period of a first length to determine a network packet count;
      (ii) for each network packet of a subset of the counted network packets over a second time period within the first time period, measuring a corresponding arrival time for the network packet at the monitoring location;
      (iii) determining an average time between the counted network packets by dividing the first length of the first time period by the network packet count;
      (iv) for each of the network packets of the subset of the counted network packets, determining a corresponding ideal arrival time for the network packet from the average time between the counted network packets and the start or finish of the first time period;
      (v) for each network packet of the subset of the counted packets, determining a corresponding deviation of the measured arrival time of the network packet from the ideal arrival time of the network packet;
      (vi) averaging the deviations for the subset of the counted packets to determine a corresponding jitter value for the second time period; and
      (vii) sliding the first time period forward by a predetermined amount; and
      (viii) repeating steps (i) to (vii) to determine successive jitter values for respective times.

26. An apparatus for detecting online gaming sessions, including:
   a memory;
   at least one processor;
   an online gaming detection component configured to:
      (i) monitor network packet flows at a monitoring location between one or more client gaming devices and one or more game servers, by:
         (a) counting network packets of an online game over a first time period of a first length to determine a network packet count;

(b) for each network packet of a subset of the counted network packets over a second time period within the first time period, measuring a corresponding arrival time for the network packet at the monitoring location;
(c) determining an average time between the counted network packets by dividing the first length of the first time period by the network packet count;
(d) for each of the network packets of the subset of the counted network packets, determining a corresponding ideal arrival time for the network packet from the average time between the counted network packets and the start or finish of the first time period;
(e) for each network packet of the subset of the counted packets, determining a corresponding deviation of the measured arrival time of the network packet from the ideal arrival time of the network packet;
(f) averaging the deviations for the subset of the counted packets to determine a corresponding jitter value for the second time period; and
(g) sliding the first time period forward by a predetermined amount; and
(h) repeating steps (a) to (g) to determine successive jitter values for respective times;
(ii) determine attributes of the monitored network packet flows; and
(iii) detect online gaming sessions by comparing the determined attributes of the monitored network packet flows with corresponding predetermined network packet flow attributes.

\* \* \* \* \*